(12) United States Patent
Hawthorne et al.

(10) Patent No.: US 12,418,340 B2
(45) Date of Patent: *Sep. 16, 2025

(54) SATELLITE ANTENNA GROUND STATION SERVICE SYSTEM

(71) Applicant: Amazon Technologies, Inc., Seattle, WA (US)

(72) Inventors: Lowell Shayn Hawthorne, Colorado Springs, CO (US); David M. Nolton, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,733

(22) Filed: Jan. 24, 2024

(65) Prior Publication Data

US 2024/0171263 A1    May 23, 2024

Related U.S. Application Data

(63) Continuation of application No. 17/371,742, filed on Jul. 9, 2021, now Pat. No. 11,923,960, which is a
(Continued)

(51) Int. Cl.
*H04B 7/185* (2006.01)
*H04W 72/0446* (2023.01)

(52) U.S. Cl.
CPC ..... *H04B 7/18513* (2013.01); *H04B 7/18578* (2013.01); *H04W 72/0446* (2013.01)

(58) Field of Classification Search
None
See application file for complete search history.

(56) References Cited

U.S. PATENT DOCUMENTS

| 6,690,934 B1 | 2/2004 | Conrad, Jr. et al. |
| 9,853,754 B1 | 12/2017 | Muakkit et al. |

(Continued)

FOREIGN PATENT DOCUMENTS

| CN | 102013916 | 4/2011 |
| CN | 102984810 | 3/2013 |

(Continued)

OTHER PUBLICATIONS

KSAT, "Kongsberg Satellite Services", Brochure, Jun. 11, 2018, pp. 1-11.

(Continued)

*Primary Examiner* — Jay L Vogel
(74) *Attorney, Agent, or Firm* — Alexander A. Knapp; Kowert, Hood, Munyon, Rankin & Goetzel, P.C.

(57) ABSTRACT

A satellite antenna ground station service includes a plurality of ground stations and associated data centers, wherein the data centers are part of a provider network. Clients may reserve satellite antenna access time-slots via a user interface of the satellite antenna ground station service and store data directly to a data center of the provider network or to the client's premises via a direct connection between the client and the provider network. In some embodiments, the provider network may offer a plurality of network-based services, such as a compute service, a data storage service, a machine learning service, or a data analytics service, and a client may utilize one or more of these services to analyze and process downlinked data received from a satellite of the client via a satellite antenna ground station of the satellite antenna ground station service of the provider network.

20 Claims, 13 Drawing Sheets

Related U.S. Application Data continuation of application No. 16/022,321, filed on Jun. 28, 2018, now Pat. No. 11,063,658.

(56) References Cited

U.S. PATENT DOCUMENTS

| | | | | |
|---|---|---|---|---|
| 11,063,658 | B2* | 7/2021 | Hawthorne | H04W 72/0446 |
| 11,923,960 | B2* | 3/2024 | Hawthorne | H04B 7/18513 |
| 2006/0101494 | A1 | 5/2006 | Lockridge et al. | |
| 2011/0169688 | A1* | 7/2011 | Wyler | H04B 7/2041 |
| | | | | 342/354 |
| 2011/0188548 | A1 | 8/2011 | Antikidis | |
| 2012/0185783 | A1 | 7/2012 | Avellan et al. | |
| 2013/0135996 | A1 | 5/2013 | Torres et al. | |
| 2015/0227355 | A1 | 8/2015 | Tripoli et al. | |
| 2016/0021216 | A1 | 1/2016 | Ashworth et al. | |
| 2016/0360547 | A1* | 12/2016 | Johnson | H04L 47/2483 |
| 2016/0365918 | A1 | 12/2016 | Hosotani et al. | |
| 2017/0085326 | A1 | 3/2017 | Li et al. | |
| 2017/0086255 | A1 | 3/2017 | Jayasimha et al. | |
| 2017/0310382 | A1 | 10/2017 | Darby, III | |
| 2018/0054420 | A1* | 2/2018 | Mindte | H04L 67/06 |
| 2018/0316429 | A1 | 11/2018 | Barritt | |
| 2019/0028544 | A1* | 1/2019 | Edgardh | H04W 4/18 |
| 2019/0058522 | A1 | 2/2019 | Haley et al. | |
| 2021/0344414 | A1 | 11/2021 | Hawthorne et al. | |

FOREIGN PATENT DOCUMENTS

| | | | |
|---|---|---|---|
| CN | 107094045 | 8/2017 | |
| CN | 107193847 | 9/2017 | |
| CN | 107193847 A * | 9/2017 | G06F 16/951 |
| CN | 107431712 | 12/2017 | |
| GB | 2521459 | 6/2015 | |
| JP | 2006060351 | 3/2006 | |
| JP | 2006186789 | 7/2006 | |
| JP | 2008310421 | 12/2008 | |
| JP | 2016116147 | 6/2016 | |
| JP | 2017512415 | 5/2017 | |
| JP | 2018506775 | 3/2018 | |
| WO | 2016106242 | 6/2016 | |
| WO | 2016160848 | 10/2016 | |
| WO | 2017190094 | 11/2017 | |
| WO | 2018016471 | 1/2018 | |

OTHER PUBLICATIONS

"ON-ORBIT World's largest multi-mission ground station network", Retrieved from URL: https://www.sscspace.com/services/on-orbit on Jun. 11, 2018, pp. 1-3.

Xiangang Zhao et al., "A Cloud Computing Platform for FY-4 Based on Resource Scheduling Technology", dated 2016, pp. 1-6.

Office Action mailed Dec. 30, 2021 in Chinese Patent Application No. 201980043600.7, Amazon Technologies, Inc., pp. 1-17 (including translation).

Office Action mailed Feb. 15, 2022 in Japanese Patent Application No. 2020-570555, Amazon Technologies, Inc., pp. 1-5 (including translation).

* cited by examiner

300

Ground Station as a Service (GSaaS)

◯ https://<website>.com/Satellite Antenna Ground Station Service-Scheduling

Welcome to the Ground Station as a Service (GSaaS) Console.

Here, you can verify ownership/authorization for one or more satellites, schedule contacts with authorized satellites, and manage scheduled contacts.

302

Satellite Verification/Authorization

| | |
|---|---|
| Satellite Name | XXXXXXX ← 304 |
| Satellite Identifier | 1990-037B ← 306 |
| Other Identifying/Authorization Information | ABC-123-DEF ← 308 |

310 → Verify Authorization!

312

Schedule Contact(s)

| | |
|---|---|
| Select Satellite | Satellite 1 ← 314 |
| Select Time | May 1st 18:00 ← 316 |
| Select Duration | 15 minutes ← 318 |
| Select Ground Station | Oslo ← 320 |

Suggestions needed? ← 332     322 → Submit!

324

Auto-Determine Contact(s) to Transfer Specified Amount of Data

| | |
|---|---|
| Select Satellite | Satellite 3 ← 326 |
| Data Quantity | 100 Gigabytes ← 328 |

330 → Submit!

*FIG. 3A*

SATELLITE ANTENNA GROUND STATION SERVICE SYSTEM

This application is a continuation of U.S. patent application Ser. No. 17/371,742, filed Jul. 9, 2021, which is a continuation of U.S. patent application Ser. No. 16/022,321, filed Jun. 28, 2018, now U.S. Pat. No. 11,063,658, which are hereby incorporated by reference herein in their entirety.

BACKGROUND

Satellites are being used by an increasing number of businesses, universities, and governments for applications including weather, surface imaging, communications, video broadcasts, as well as other applications. To do this today, satellite owners/operators must also build or obtain long-term leases on ground antennas to communicate with their satellites.

Building or obtaining long-term leases on ground antennas may be a significant undertaking and cost for satellite owners/operators because antennas are often required in multiple countries to maintain satellite connectivity. In addition, infrastructure needs of satellite owners/operators may also include compute servers and storage servers in close proximity to the antennas to process satellite communications and durably store the received data. Additionally, satellite owners/operators may need to host and run additional software to use received satellite data in their businesses.

All of these infrastructure needs may require significant capital investments and employee costs to build, monitor, manage, and maintain each antenna location. Also, the ground antennas and associated infrastructure may not be continuously or fully utilized. For example, for a satellite owner/operator with a limited number of satellites, ground antennas of the satellite owner/operator may only be utilized when one of the satellite owner/operator's satellites is within range of the ground antennas, and the ground antennas may otherwise be un-used between periods of time when one of the satellite owner/operator's satellites are within range.

BRIEF DESCRIPTION OF THE DRAWINGS

FIG. 3A illustrates an example graphical user interface of a satellite antenna ground station service for scheduling satellite antenna access time slots for contact with client satellites, according to some embodiments.

Figure 1:
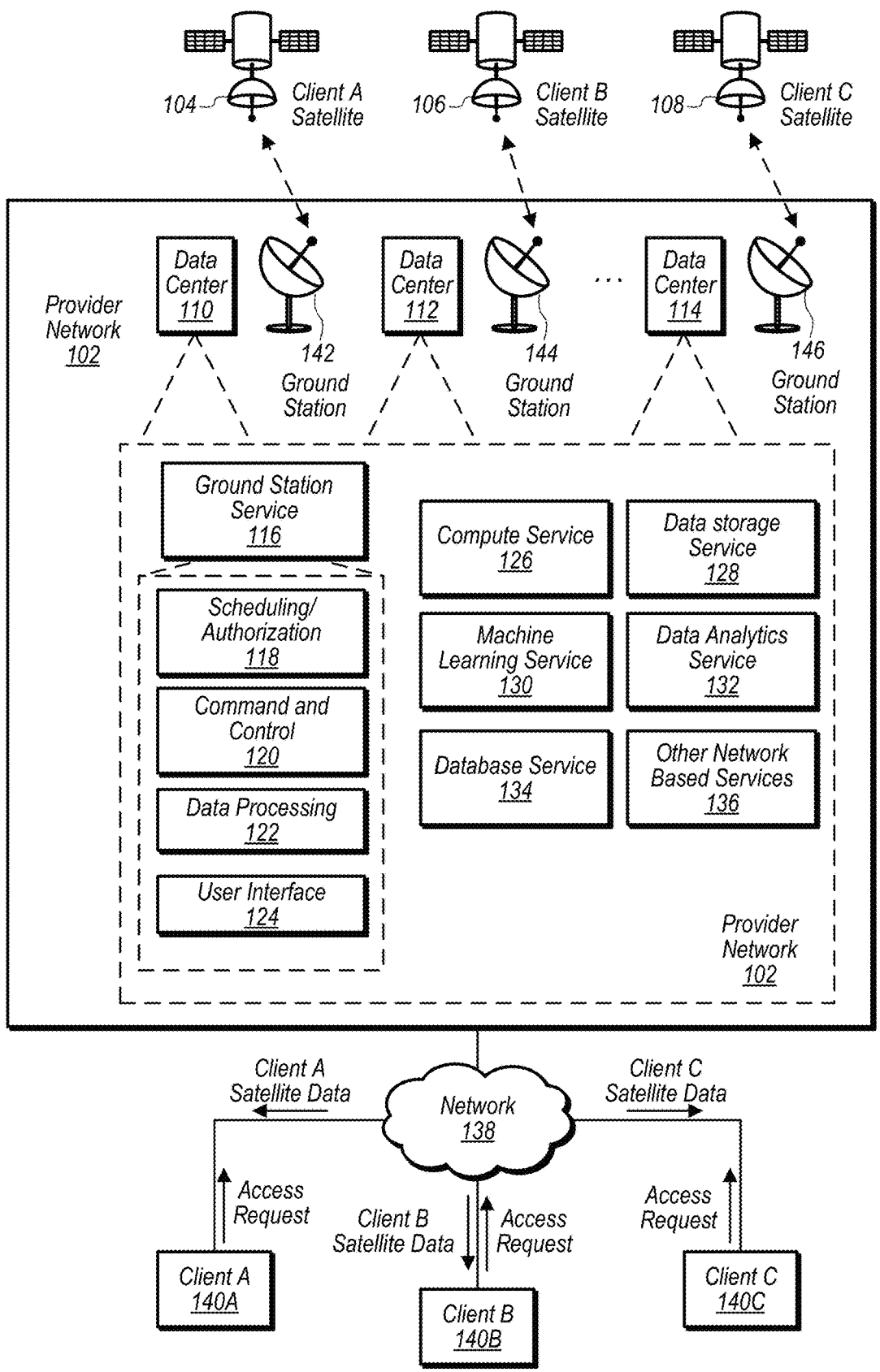
FIG. 1 illustrates a provider network comprising data centers with associated satellite antenna ground stations, and wherein the provider network offers a satellite antenna ground station service to clients, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a satellite antenna ground station service of a provider network. According to some embodiments, a service provider network includes a plurality of data centers located in different geographic areas and a plurality of satellite antenna ground stations, wherein respective ones of the satellite antenna ground stations are connected to corresponding ones of the data centers that are located in same geographic areas as the respective ones of the satellite antenna ground stations. For example, a provider network may include multiple availability zones, each located in a different geographic area and connected to one another via the provider network. Continuing the example, each availability zone may include at least one data center and at least two satellite antennas located at one or more ground stations located proximate to one of the data centers included in the availability zone. The service provider network also includes one or more computing devices, which may be included in one of the data centers or elsewhere, configured to implement a multi-tenant scheduling service for a multi-tenant satellite antenna ground station service. The multi-tenant scheduling service is configured to receive satellite antenna access requests from a plurality of clients of the provider network and schedule satellite antenna access time-slot reservations for the clients on respective ones of the plurality of satellite antennas.

According to some embodiments, a multi-tenant satellite antenna ground station service includes a plurality of satellite antennas and one or more computing devices configured to implement a multi-tenant scheduling service. The multi-tenant scheduling service is configured to receive a satellite antenna access request from a client of a plurality of clients of the multi-tenant ground station service and schedule a satellite antenna access time-slot reservation for the client on a respective one of the plurality of satellite antennas.

According to some embodiments, a method includes providing, to a client, a user interface to a multi-tenant satellite antenna ground station service. The method also includes receiving, via the user interface, a satellite antenna access request from the client and scheduling a satellite antenna access time-slot for the client on one or more of a plurality of satellite antennas of the multi-tenant ground station service.

Typically satellite owners/operators operate their own satellite antenna ground stations, or rent time on an antenna and connect their own hardware and/or software to the rented antenna at a ground station operated by another entity. Also, most satellite owners/operators provide and manage the required network equipment to connect an owned or rented satellite antenna to a storage location to store data received from the satellite owner/operator's satellite. The costs involved in building and maintaining a satellite antenna ground station and/or renting a satellite antenna at a commercial satellite antenna ground station may be high for many satellite owners/operators and may be prohibitive for other potential satellite owners/operators. Also, due to the high costs involved with owning a satellite antenna ground station or renting an antenna at a commercial satellite antenna ground station, many satellite owners/operators may maintain a limited number of satellite antennas for contacting their satellites. For example, to reduce costs, a satellite owner/operator may minimize a number of satellite antennas the satellite/owner operator maintains access to.

Satellite owner/operators may communicate with their satellites via the limited number of satellite antennas that the satellite owner/operators maintain access to, but may not be able to communicate with the satellite owner/operator's satellites when the owner/operator's satellites are out of range of the satellite antennas that the satellite owner/operators maintain access to. During periods of time when the satellites are out of range, the satellite antennas maintained for access by the satellite owner/operator may go un-used. This may represent a lost cost because satellite antenna access time is a perishable resource, that when left un-used is lost forever. For example, an un-used amount of time in the past is lost and cannot be used in the future. Likewise, a satellite resource may, at least in part, be a perishable resource, that when left un-used is lost forever. For example, a communication satellite that is unable to relay communications during a period when the satellite is out of range, may be a lost cost because the amount of communications not processed in the past cannot be added to a future capacity, but is instead lost forever. Thus, a satellite owner/operator with a limited number of satellite antennas may experience losses of perishable satellite antenna access time and losses of perishable satellite access time, when the satellite owner/operator's satellite(s) are out of range of the satellite owner/operator's satellite antenna(s).

As an example, a polar ground station and a polar orbit satellite may be in range of each other for 10 minutes of a 90-minute orbit of the polar satellite, but may be un-used for the remaining portion of the 90-minute orbit.

In some embodiments, a satellite antenna ground station service provides satellite antenna ground station access time-slot reservations to a client for periods of time as short as a single minute, or access windows of other durations (e.g. 10 minutes, 15 minutes, etc.). Also, in some embodiments, a satellite antenna ground station service allows a client to place a time-slot reservation request within a short amount of time of the requested time slot, e.g. 15 minutes before the requested time slot. Whereas traditional satellite antennas require long lead-times to build, or to lease, and configure, a satellite antenna ground station service may provide short lead times (e.g. as short at 10 minutes), by utilizing a network of satellite antenna ground stations and systems easily configurable to access various types of satellites. Additionally, the network of satellite antenna ground stations are connected to a high-speed network that includes local data centers proximate to the satellite antenna ground stations. Also a satellite antenna ground station service may provide clients with "elastic" satellite antenna ground station capacity that can be scaled up or down based on client demand. For example, a client that needs to downlink a large amount of data may reserve satellite antenna access time-slots on multiple satellite antenna ground stations in various locations to downlink the large amount of data and may not be required to reserve the satellite antenna ground stations for other time-slots when the client does not need to downlink large amounts of data or does not need to downlink data at all. Thus, the client may be required to pay for the actual amount of satellite antenna ground station access time the client needs and may not be required to pay for satellite antenna ground station access time when the client does not need to access the client's satellite.

Also, a satellite antenna ground station service may be part of a provider network that includes ample capacity to store data received from a satellite and make the data available at any location around the world. For example a provider network may be accessible from any location connected to the Internet or otherwise connected to the provider network, such as via a direct physical connection to the provider network (e.g. a dedicated network connection, such as those offered by AWS Direct Connect). Also, in some embodiments, satellite antennas of a satellite antenna ground station service may be located around the world in mid-latitude locations, such that at least one of the satellite antennas of the satellite antenna ground station service is in range of a client satellite (or will be momentarily) at any given time.

For example, a satellite antenna ground station service may enable a client to take a picture of Greece via the client's satellite, download the picture data to a satellite antenna ground station service ground station in India 10 minutes later, process the picture data on a compute instance of the provider network located in a data center in India or in various other locations connected to the provider network, and deliver the processed picture data to a customer in Saudi Arabia 10 minutes after the picture was captured over Greece. In comparison, a similar case using a polar ground station would take 45 minutes for the satellite to pass over Greece and reach the polar ground station.

In some embodiments, mid-latitude locations may include inhabited land masses and oceans between 60-degrees North latitude and 60-degrees South latitude.

In some embodiments, a satellite antenna ground station service integrates satellite antennas and software defined radios/radio frequency digitizers into data center locations around the world to provide a global ground station service, e.g. ground stations as a service (GSaaS). In some embodiments, a satellite antenna ground station service further includes front-end processors implemented on virtual compute resources and/or encryption modules implemented on the virtual compute resources to further process and de-crypt downlinked data and encrypt data to be uplinked to a client satellite. In some embodiments, a client may perform the client's satellite operations via the satellite antenna ground station service (e.g. satellite control, data uplink, and/or data downlink) and additionally process downlinked data via any one or more of a plurality of services offered by the provider network such as a virtual computing service, data storage service, machine learning service, data analytics service, visual recognition service, database service, or other supported network-based services. In some embodiments, a client may opt to process the client's downlinked data on the client's own premises and may use a satellite antenna ground station service to contact the client's satellite and transport downlinked data to the client's premises for processing.

In some embodiments, a satellite antenna ground station service may support S-band frequency communications and X-band frequency communications, for example for communicating with a low earth orbit (LEO) satellite. In some embodiments, a satellite antenna ground station service may support C-band frequency communications, Ku-band frequency communications, and Ka-band frequency communications, for example for communicating with a geosynchronous orbit (GEO) satellite. In some embodiments, a satellite antenna ground station service may support UHF-band frequencies. In some embodiments, a satellite antenna ground station service may support various other frequency band communications for communicating with various other types of satellites. As an example, a satellite antenna ground station service may allow a streaming communications company client to receive and transmit live media content from events such as the Super Bowl or the Olympics by downlinking the live media content to a high capacity provider network comprising thousands or millions of servers located in data centers around the world and streaming the live media content from the servers to customers of the streaming communications company client.

In some embodiments, a satellite antenna ground station service may include an identity and access management service, or be connected to an identity and access management service, that enforces an identity and access management policy for contacting satellites. In some embodiments, a client of a satellite antenna ground station service may submit information validating ownership of a satellite of the client or authorization to access a satellite to the identity and access management service. Once validated, the client may schedule contacts with the satellite via satellite antenna access reserved time-slots for satellite antennas of the satellite antenna ground station service.

In some embodiments, prior to a reserved satellite antenna access time-slot, a satellite antenna ground station service may instantiate one or more session instances using virtualized compute resources of another service of a service provider network that includes the satellite antenna ground station service, such as a compute service of the provider network. In some embodiments, physical computing resources may be used for session instances (as opposed to virtual compute resources). In some embodiments, the session instances may include a client data processing instance, as also referred to herein as a "downlink instance." The session instances may also include a client command and control instance. In some embodiments, a client data processing or "downlink instance" may process downlinked data that has been converted from analog data received by a satellite antenna to internet protocol (IP) digital data. For example, a satellite antenna ground station of a satellite antenna ground station service may include a software defined radio and/or digitizer that converts analog radio signals into digital signals. The satellite antenna ground station may further include a receiver that may perform demodulation, forward error correction, and conversion to IP. For example, downlinked data may be converted to IP in accordance with the VITA 49 standard (VMEbus (Versa Module Europa bus) International Trade Association 49 standard). Additionally, a client data processing or "downlink instance" may break the digital data into frames via a front end processor and may further decrypt the downlinked data frames via an encryption/decryption module of the client data processing or downlink instance, wherein the downlinked data frames are decrypted into decrypted data frames.

In some embodiments, the session instances, e.g. the client data processing instance or "downlink instance" and the client command and control instance that are instantiated for a reserved satellite antenna access time-slot may be separated from a ground station controller and ground station downlink router by a gateway of the ground station. In some embodiments, the gateway may limit access to the ground station controller and ground station downlink router. For example, session instances for a first client may access the ground station controller and downlink router via the gateway during a time-slot reserved for the first client and the session instances may be prevented from accessing the ground station controller and ground station downlink router outside of reserved time-slots reserved for the first client. In this way, multiple clients may each have session instances instantiated and configured to communicate with satellites of the respective clients at the same time, but only a single client's session instances may access the satellite antenna during a reserved time-slot. Note that because other clients already have session instances ready-to-go prior to the beginning of their time-slots, the clients may not need to waste time during a reserved time-slot to instantiate a data processing instance or client command and control instance configured to communicate with the clients' respective satellites.

In some embodiments, data downlinked from a client satellite may be added to a "data lake" maintained by one or more data centers of a provider network that includes the satellite antenna ground station service. In some embodiments, more than one client may contribute downlinked data to a "data lake." In some embodiments, a provider network may include a data analytics service, a machine learning service, a visual recognition service, or other services that utilize "data lake" data to learn new relationships or for other purposes. In some embodiments, in addition to satellite antenna ground station access being elastic and easily scalable (either up or down), other services of the provider network may be elastic and easily scalable (either up or down). For example, a compute service that processes downlinked data may be elastic and easily scalable (either up or down). In a similar manner, a data storage service may be elastic and easily scalable (either up or down) to store data downlinked from a satellite or to store other types of data, such as data generated based on downlinked data.

In some embodiments, a satellite antenna ground station service may make contact with a low earth orbit satellite (LEO). A LEO satellite may be used for earth observation, as an example, and may transmit up to 15 terabytes of data to a client via the satellite antenna ground station service or the satellite antenna ground station service may store the transmitted data on behalf of the client in a storage service of a provider network that includes the satellite antenna ground station service. In some situations, a LEO satellite may complete 16 orbits around the earth in a day. In some embodiments, a satellite antenna ground station service may make contact with a medium earth orbit satellite. A medium earth orbit satellite may be used for global positioning (GPS), as an example, and may orbit the earth between 2 and 10 times a day. In some embodiments, a satellite antenna ground station service may make contact with a geosynchronous satellite (GEO). A GEO satellite may only orbit the earth once a day and may stay in the same place in the sky relative to the earth. Thus, GEO satellites may often be used for broadcasting (such as for satellite TV services), communications relays, macro weather observations, tracking ships, planes, etc.

It is worth noting that because a satellite antenna ground station service as described herein may be integrated into a provider network that includes multiple data centers and networking equipment to connect the multiple data centers to one another and to customers, clients of a satellite antenna ground station service may not need to build network connections to ground stations (as is the case for current commercial satellite antenna ground stations) because the ground stations of the satellite antenna ground station service are already connected to a data center that is integrated into the provider network.

FIG. 1 illustrates a provider network comprising data centers with associated satellite antenna ground stations, wherein the provider network offers a satellite antenna ground station service to clients, according to some embodiments.

Provider network 102 includes data center 110 and associated ground station 142, data center 112 and associated ground station 144, and data center 114 and associated ground station 146. In some embodiments, a provider network, such as provider network 102, may include additional data centers and associated ground stations. Provider network 102 is also connected to client A 140A, client B 140B, and client C 140C via network 138. In some embodiments, a provider network, such as provider network 102, may be connected to any number of clients and a satellite antenna ground station service of the provider network, such as ground station service 116 may provide satellite antenna ground station services to any number of clients of the provider network. For example, provider network 102 is also capable of making contacts with satellites owned by or operated by clients A-C via satellite antennas at ground stations 142, 144, and 146 of ground station service 116. For example, ground station 142 may be contacting client A satellite 104, ground station 144 may be contacting client B satellite 106, and ground station 146 may be contacting client C satellite 108.

In some embodiments, data downlinked from a client satellite by a satellite antenna ground station service may be provided to, and/or stored in, a data center associated with a ground station of the satellite antenna ground station service. For example, data downlinked from client A satellite 104 may be made available to, and/or stored in, data center 110. Additionally, in some embodiments, each data center of a provider network may be connected to other ones of the data centers of the provider network via high-speed network connections of the provider network. For example, data centers 110, 112, and 114 may be connected to one another via high-speed network connections of provider network 102. Thus, any client of a satellite antenna ground station service with access to a provider network that includes a satellite antenna ground station service, for example via an internet connection to the provider network, may access data downlinked from the client's satellite. Moreover, in some embodiments, the client may access the downlinked data using high-speed network connections of the provider network from remotely located data centers such that data access latency from the perspective of the client is not significantly different as compared to if the data was accessed from a locally situated data center. Additionally, in some embodiments, downlinked client data may be relocated to a data center proximate to the client and/or consolidated in a data center proximate to a client from a plurality of data centers. For example, downlinked data may be collected using corresponding satellite antennas ground stations associated with a plurality of data centers and transmitted over high-speed network connections of a provider network such that the downlinked data is consolidated at one or more data centers.

Additionally, computing devices, such as storage servers, compute servers, networking devices, etc. of a provider network, such as provider network 102, may implement a plurality of other provider network services. For example, the dotted line box shown in FIG. 1 illustrates a logical view of services that may be offered by provider network 102 using physical hardware located in data centers 110, 112, 114, etc. In some embodiments, in addition to ground station service 116, a provider network may also offer a compute service 126, wherein the compute service implements virtualized compute instances that are allocated to clients of the compute service, and wherein the virtualized compute instances are implemented using physical computing devices included in the data centers 110, 112, 114, etc. In some embodiments, a provider network, such as provider network 102, also offers a data storage service, such as data storage service 128. In some embodiments, a data storage service may be any one of various types of data storage services, such as a block-based storage service that provides block-storage resources to compute instances of a compute service, such as compute service 126. Also, in some embodiments, a data storage service, may be an object-based storage service that stores data objects, such as downlinked satellite data, on behalf of clients, or may be a cold storage service that provides a low-cost storage solution for infrequently accessed data objects, such as downlinked satellite data.

In some embodiments, a provider network, such as provider network 102 also includes a machine learning service, such as machine learning service 130. In some embodiments, a machine learning service may apply machine learning techniques to downlinked satellite data, such as may be stored in data storage service 128. In some embodiments, a provider network, such as provider network 102, may further include a data analytics service, such as data analytics service 132. In some embodiments, a data analytics service may perform data analysis operations on downlinked satellite data, and/or other data stored in a data storage service of a provider network. For example, in some embodiments, a data analytics service may compare data collected from other sources with downlinked satellite data to perform data analysis.

In some embodiments, a provider network, such as provider network 102, may further include a database service, such as database service 134. In some embodiments, one or more databases managed by database service 134 may be at least partially populated with satellite downlink data received from a client satellite, wherein the populated database is made available to the client. Also, in some embodiments, a provider network, such as provider network 102, may provide a plurality of other network-based services, such as other network-based services 136, which may be used to analyze, manipulate, store, etc. satellite downlink data received from a client's satellite. For example, in some embodiments, other network-based services 136 may include an elastic map reduce service, a query service, multiple types of machine learning services (in addition to, or as a part of, machine learning service 130), an encryption key management service, a software development kit service, a networking service, a mobile communication service, an internet of things (IoT) service, a security service, an enterprise application, etc.

In some embodiments, a satellite antenna ground station service, such as ground station service 116, implements a user interface, such as user interface 124. In some embodiments, a client may verify ownership or authority over a satellite by submitting identifying credentials to the satellite service via the user interface. In some embodiments, a scheduling/authorization component, such as scheduling/authorization component 118, may verify the client's ownership of a satellite or the client's authority in regard to the satellite. Once a client is authorized for a given client satellite, the client may submit a request for a satellite antenna access time-slot for a contact session with the client's satellite for which the client has been authorized. For example, clients A-C submit access requests to ground station service 116 via network 138 and user interface 124 of ground station service 116. In some embodiments, a user interface of a satellite antenna ground station service, such as user interface 124, may be a web-based graphical user interface, wherein a client submits a satellite antenna access time-slot request via the graphical user interface. In some embodiments, a user interface of a satellite antenna ground station service, such as user interface 124, may be an application programmatic interface (API), wherein a client programmatically submits a request for a satellite antenna access time-slot via the API of the satellite antenna ground station service.

In some embodiments, a satellite antenna ground station service scheduling/authorization component may reserve a time-slot on a satellite antenna of the satellite antenna ground station service in response to receiving a request from a client of the satellite antenna ground station service. In some embodiments, a client of a satellite antenna ground station service may indicate, in a request, a desired ground station location, a desired time-slot, a satellite to be contacted during the satellite antenna access time-slot, and/or additional information about the requested satellite antenna access time-slot. In some embodiments, a scheduling/authorization component of a satellite antenna ground station service, such as scheduling/authorization component 118 of ground station service 116, may match requested time-slots, requested ground stations, etc. with available time-slots on satellite antennas of ground stations included in the satellite antenna ground station service.

In some embodiments, a scheduling/authorization service, such as scheduling/authorization component 118, may apply one or more prioritization factors to determine a priority for clients requesting conflicting time-slots. For example, some client applications may not be materially affected by using a different ground station than a requested ground station while others may be, or some clients may not specify a requested ground station location. In such situations, a scheduling/authorization component, such as scheduling/authorization component 118, may prioritize requests from clients that are impacted by ground station location over requests from clients that are less impacted by changing a ground station location when requests for a same ground station during a same time-slot are conflicting. Also, in a similar manner, a scheduling/authorization component, such as scheduling/authorization component 118, may apply one or more prioritization factors to resolve conflicting requests based on time. For example, some client applications may be sensitive to time delays, whereas other client applications may be less sensitive to time delays. In such situations, a scheduling/authorization component, such as scheduling/authorization component 118, may prioritize time-sensitive requests ahead of other requests.

In some embodiments, a scheduling/authorization component may operate according to a first come/first served model, wherein time-slot reservations are provided to clients from a stock of remaining available time slots at ground stations included in the satellite antenna ground station service based on an order in which the requests are received. In some embodiments, a scheduling/authorization component may operate according to a hybrid model, wherein time-slot reservations are provided to clients from a stock of remaining available time slots at ground stations included in the satellite antenna ground station service based on an order in which the requests are received with exceptions made for certain classes of sensitive requests that may be time-sensitive or ground station location-sensitive.

In some embodiments, a satellite antenna ground station service integrates a satellite and/or antenna control plane and data plane into a provider network service, such as a satellite antenna ground station service. For example, in some embodiments a satellite antenna ground station service, such as ground station service 116, includes a command and control component and a data processing component, such as command and control component 120 and data processing component 122. In some embodiments, a client of a satellite antenna ground station service may remotely control one or more parameters of a ground station and/or the client's satellite via a command and control component, such as command and control component 120. For example, a client may interact with a command and control component via a user interface of a satellite antenna ground station service, such as a web-based graphical user interface or an API to the satellite antenna ground station service, such as user interface 124.

In some embodiments, a command and control component, may be implemented using a compute instance of a compute service, such as a compute instance provided by compute service 126, wherein the compute instance is allocated for the purpose of instantiating a command and control instance. In a similar manner, a data processing component, may be implemented using a compute instance of a compute service, such as a compute instance provided by compute service 126, wherein the compute instance is allocated for the purpose of instantiating a data processing component.

In some embodiments, session instances such as a command and control instance and a data processing instances may be instantiated prior to a reserved time-slot reserved for a client. Thus, the command and control instance and the data processing instance may be ready to downlink or uplink data to a client satellite at the beginning of a reserved time-slot without requiring configuration delays to configure a command and control component or a data processing component after the beginning of the reserved time-slot. Also, in some embodiments, configurations for a command and control component and a data processing component for a particular client may be stored by a satellite antenna ground station service and may be used to instantiate command and control instances and/or data processing instances for future time-slots reserved for the client.

In some embodiments, session instances, such as a command and control instance and a data processing instance may be implemented on computing resources of a data center attached to, or associated with, a ground station at which a client has a reserved time-slot for satellite antenna access. Thus, data downlinked from the client's satellite during the access time-slot via a satellite antenna of the satellite antenna ground station service may be locally processed at an attached data center via a data processing instance implemented at the attached data center. In a similar manner, a locally implemented command and control instance may be implemented at a data center attached to a satellite antenna allocated to a client during a reserved time-slot of satellite antenna access.

In some embodiments, ground stations of a satellite antenna ground station service, such as ground stations 142, 144, and 146, include one or more satellite antennas, software defined radios, and modems to communicate with satellites using radio signals. In some embodiments, a ground station may receive data downlinked from a client satellite, monitor health and status of client satellite, provide commands to the client satellite to perform tasks, such as take a picture, or transmit television, voice, or radio signals to customers on earth, as an example. In some embodiments, a ground station may include redundant components such as a primary and secondary antenna, software defined radio, modem, etc.

In some embodiments, a user interface of a satellite antenna ground station service, such as user interface 124, may include one or more APIs that function as endpoints that allow programmatic integration of a satellite antenna ground station service into existing satellite operation systems. In some embodiments, a satellite antenna ground station service may further relay communications using a satellite owned or operated by the satellite antenna ground station service to other ground stations. For example, a satellite antenna ground station service may downlink data from a client satellite and then relay the downlinked data to another ground station via a geosynchronous satellite operated by the satellite antenna ground station service.

Figure 2:
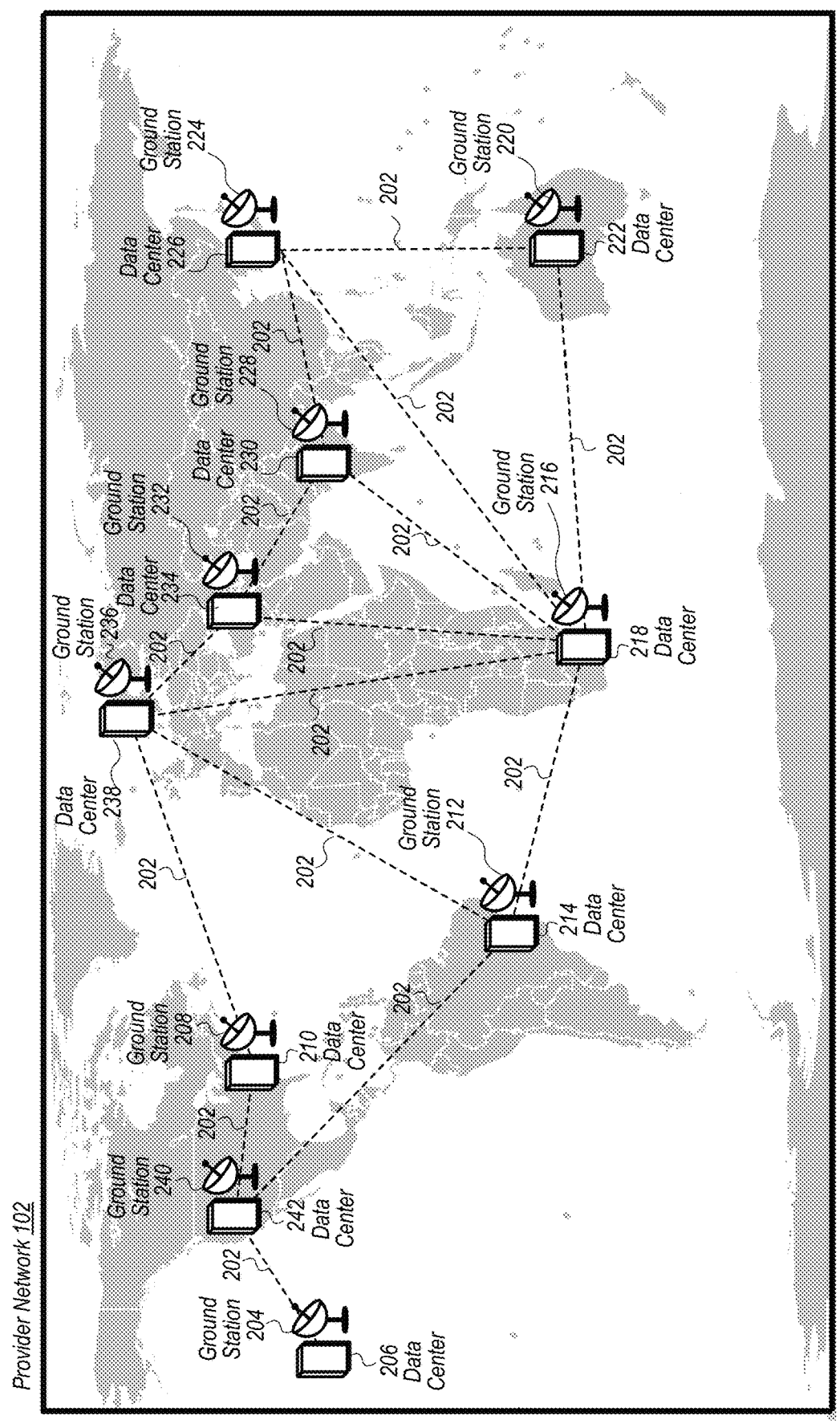
FIG. 2 illustrates a provider network that includes data centers and associated satellite antenna ground stations in various geographical locations, according to some embodiments.

FIG. 2 illustrates a provider network that includes data centers and associated satellite antenna ground stations in various geographical locations, according to some embodiments.

In some embodiments, a satellite antenna ground station service may include multiple ground stations and associated data centers spread throughout the mid-latitude regions of the earth such that a client satellite is in range (or will be in range momentarily) of at least one ground station of the satellite antenna ground station service regardless of a position of the satellite in the satellite's orbit.

For example, a provider network, such as provider network 102, may include a ground station 204 and associated data center 206 in the Pacific Ocean, either on an island or implemented on an ocean going vessel or platform. The provider network may also include a ground station 240 and data center 242 on the Pacific Coast of the United States that is connected to data center 206 via network connection 202, which may be a fiber-optic high speed cable, as an example. Additionally, the provider network may include another ground station 208 and data center 210 on the East Coast of the United States.

As is shown in FIG. 2, a provider network, such as provider network 102, may include any number of ground stations and associated data centers located around the world. For example, provider network 102 also includes ground station 236 and data center 238 located in Oslo, Norway, ground station 212 and data center 214 located in Brazil, ground station 216 and data center 218 located in South Africa, ground station 220 and data center 222 located in Australia, ground station 224 and data center 226 located in Japan, ground station 228 and data center 230 located in India, ground station 232 and data center 234 located in Turkey, and ground station 236 and data center 238 located in London.

In some embodiments, each of the data centers of provider network 102 may be connected to one another via high-speed connections 202. In some embodiments, more or fewer high-speed connections 202 may be included in a provider network 102 between data centers.

FIG. 3A illustrates an example graphical user interface of a satellite antenna ground station service for scheduling satellite antenna access time slots for contact with client satellites, according to some embodiments.

Figure 3B:
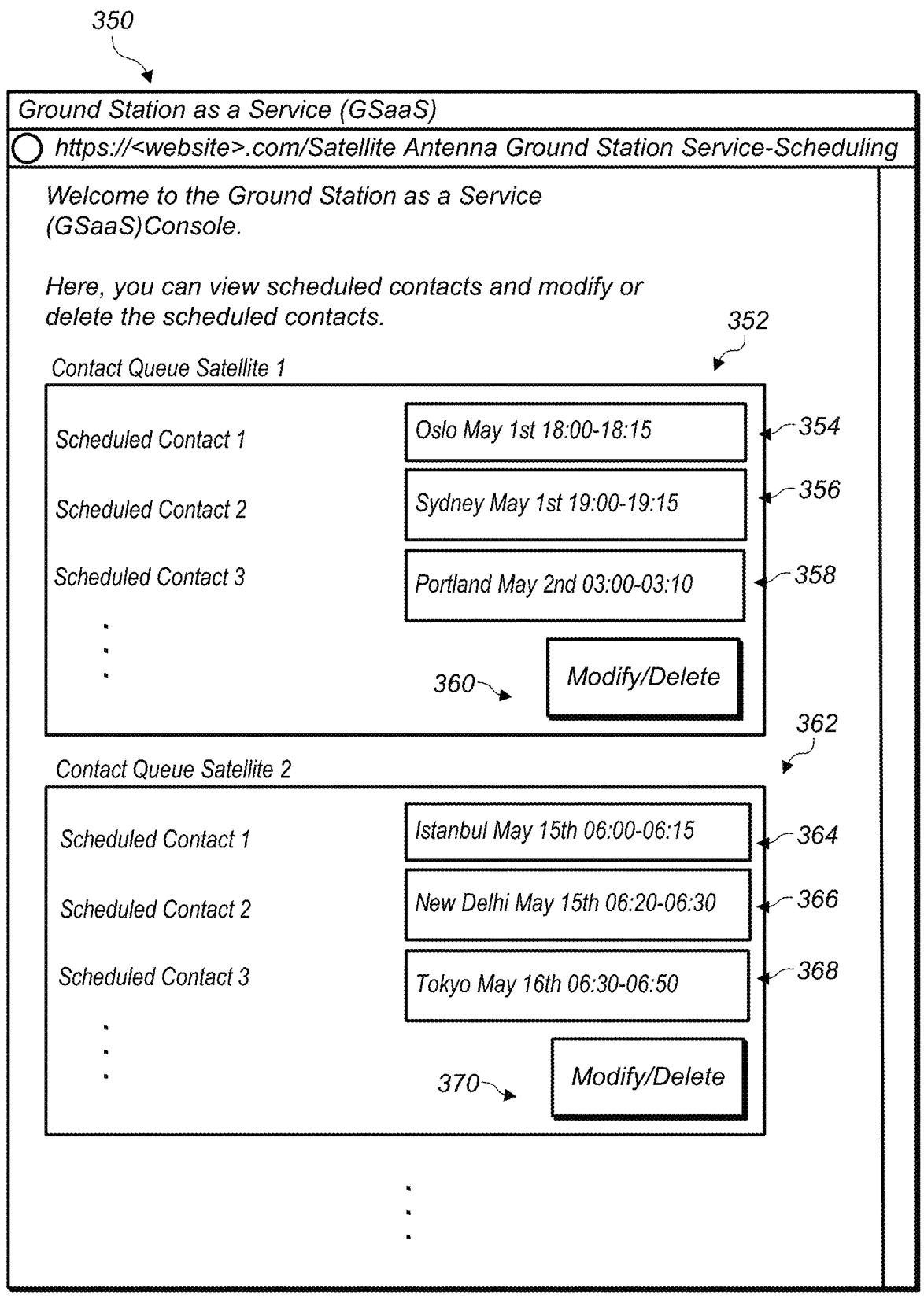
FIG. 3B illustrates an example graphical user interface of a satellite antenna ground station service for managing reserved satellite antenna access time-slots, according to some embodiments.

In some embodiments, a user interface of a satellite antenna ground station service, such as user interface 124 of ground station service 116 illustrated in FIG. 1, may provide a client a graphical user interface for scheduling satellite antenna access time-slots as shown in FIGS. 3A-3B. For example, scheduling interface 300 includes a satellite verification/authorization element 302, contact scheduling element 312, and an automatic contact scheduling element 324.

In some embodiments, a client may provide satellite identification information and authorization information to a satellite antenna ground station service for a satellite owned or operated by the client. For example, a client may provide a satellite name via box 304, a satellite identifier, such as a NORAD Catalog Number, NORAD ID, NASA catalog number, USSPACECOM object number, other catalog numbers and similar variants, a COSPAR number, etc. via box 306. Additionally, a client may provide other identifying information or authorization information via box 308. In order to verify authorization, the client may click button 310 after populating one or more of boxes 304, 306, or 308.

In some embodiments, a satellite antenna ground station service may maintain an authorization database and may compare submitted information to information stored in the authorization database in order to verify a client' authorization to communicate with a satellite. Also, in some embodiments, a satellite antenna ground station service may submit information provided by a client to a third-party to verify authorization, such as a governmental entity. Once authorization/ownership has been verified, the client may schedule contact sessions with the verified satellite via scheduling element 312.

For example, a client may enter a name of a satellite that is to be contacted via box 314 of scheduling element 312. The client may also indicate a desired time-slot via box 316 and optionally indicate a desired ground station location via box 320. In some embodiments, a client may desire that the satellite antenna ground station service provide a suggested time-slot and/or ground station to schedule for a reserved satellite antenna access time-slot. For example, a client may enter a satellite name via box 312 and may click button 332 to be provided with a suggested time-slot and/or suggested ground station location. In some embodiments, a client may specify a ground station or time-slot and may request a recommendation for a time-slot at the specified ground station or a ground station at the specified time slot. In order to reserve a satellite antenna access time-slot, the client may click submit button 322 to reserve the time and ground station indicated in boxes 316 and 320. In response a satellite antenna ground station service, may send a confirmation message to the client confirming the reservation.

In some embodiments, a client may be more concerned with an amount of data to be uplinked or downlinked to or from a client satellite and may be less concerned with when a contact session takes place or from which ground station a contact session takes place. In such situations, a client may identify a satellite to be contacted via box 326 of automatic contact scheduling element 324 and may indicate an amount of data to be transmitted via box 326 of automatic contact scheduling element 324. The client may then click button 330 to reserve a sufficient number and/or duration of satellite antenna access time-slots to transfer the amount of data indicated via box 328. In some embodiments, a scheduler of a satellite antenna ground station service may determine a number and duration of contact sessions required to transmit the requested amount of data and may reserve satellite antenna access time-slots sufficient to conduct the determined number and duration of contact sessions to transmit the indicated amount of data. In some embodiments, instead of indicating an amount of data to be transferred, a client may indicate one or more files, objects, etc. to be uplinked to a satellite or downlinked from a satellite and the scheduler of the satellite antenna ground station service may determine the amount of data needed to uplink or downlink the indicated files or objects. The scheduler of the satellite antenna ground station service may then reserve satellite antenna access time-slots sufficient to conduct a determined number and duration of contact sessions to transmit the determined amount of data.

In some embodiments, a client may request contact sessions having different durations. For example, a client may request a contact session as short as five minutes. Also, in some embodiments a client may request contact sessions in multiple geographic areas or geographic regions, e.g. different ground station locations. In some embodiments, a scheduler of a satellite antenna ground station service may calculate when to reserve a contact session based on stored information about a client's satellite. For example, a scheduler may perform orbital mechanics calculations to determine when to schedule a contact session with a client's satellite. In some embodiments, a client may further indicate in a request for a contact session an identity and access management policy to be applied for the client's satellite (not shown).

FIG. 3B illustrates an example graphical user interface of a satellite antenna ground station service for managing reserved satellite antenna access time-slots, according to some embodiments.

In some embodiments, a satellite antenna ground station service may provide a contact session monitoring page, wherein clients can view scheduled contact sessions and modify or delete the scheduled contact sessions. For example, a scheduling interface, such as a contact session monitoring page, may include any number of satellite contact queues for scheduled satellite contacts. As shown in FIG. 3, scheduling interface 350 includes satellite 1 contact queue 352 and satellite 2 contact queue 362. In some embodiments, a contact queue may list scheduled contact sessions for a client satellite and may include an option to modify or delete scheduled contact sessions. For example, satellite 1 contact queue 352 lists scheduled contact sessions 354, 356, and 358 and includes modify/delete button 360. As another example, satellite 2 contact queue 362 lists scheduled contact sessions 364, 366, and 368 and includes modify/delete button 370.

In some embodiments, a client may modify or delete a scheduled contact session on short notice, such as 15 minutes prior to a scheduled start time for the contact session.

Figure 4:
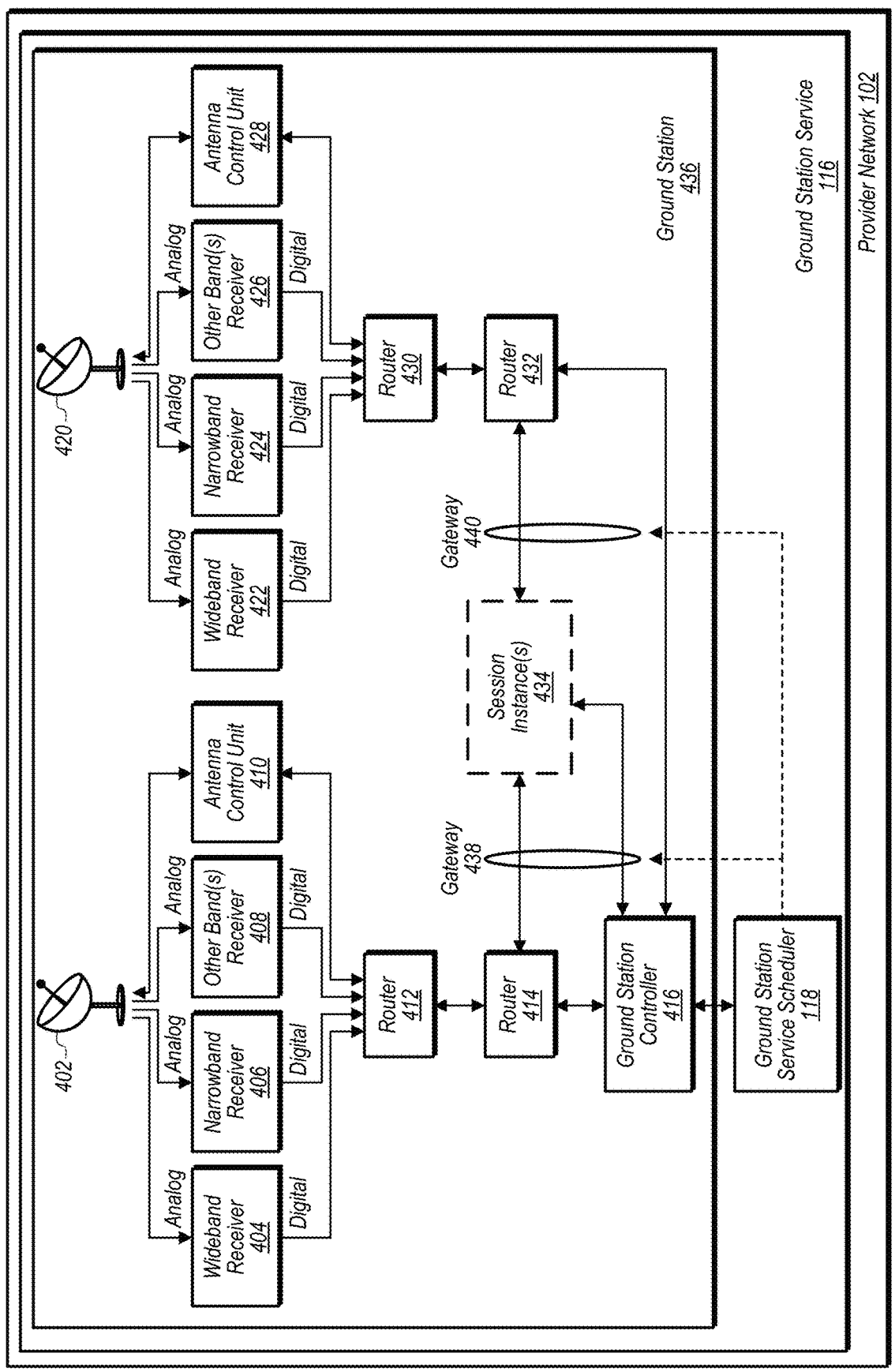
FIG. 4 illustrates a more detailed view of a ground station included in a satellite antenna ground station service, according to some embodiments.

FIG. 4 illustrates a more detailed view of a ground station included in a satellite antenna ground station service, according to some embodiments.

In some embodiments, a ground station of a satellite antenna ground station service included in a provider network, such as ground station 436 of ground station service 116 of provider network 102, includes two or more satellite antennas, such as satellite antennas 402 and 420. In some embodiments, any of the ground stations described herein, such as ground stations 142, 144, and 146 illustrated in FIG. 1, and ground stations 204, 208, 212, 216, 220, 224, 228, 232, 236, and/or 240 illustrated in FIG. 2 may include a similar arrangement of components as shown in FIG. 4 for ground station 436.

Ground station 436 includes a wideband receiver 404, a narrowband receiver 406, and other band receiver or receivers 408 connected to satellite antenna 402. Also, antenna control unit 410 is connected to satellite antenna 402. In a similar manner, wideband receiver 422, narrowband receiver 424, and other band receiver or receivers 426 are connected to satellite antenna 420, as is antenna control unit 428.

In some embodiments, the wideband receivers, narrowband receivers, and/or other band receivers may include software defined radios and/or digitizers that convert analog signals transmitted to or received from satellites into digital signals. In some embodiments, the software defined radios and/or digitizers may perform demodulation, forward error correction and conversion of the digital signals into internet protocol formatted data (IP formatted data). In some embodiments, a router, such as router 412, may route downlinked data from the wideband receiver, narrowband receiver, or other band receiver to an additional router 414 that routes the downlinked data through a gateway 438 to session instances 434 instantiated for the client's contact session. The router 414 may also route downlinked data to the ground station controller 416. Additionally, the ground station controller 416 may communicate with a satellite antenna ground station service scheduler, for example to determine which client is scheduled for a given time-slot and to apply configurations stored for the client during the client's time slot. In a similar manner, routers 430 and 432 along with gateway 440 may route data downlinked from satellite antenna 420 to client session instances 434 and/or ground station controller 416.

In some embodiments, ground station controller 416 may control operations of satellite antenna 402 or 420 via commands routed to antenna control unit 410 or antenna control unit 428 via routers 414 and 412 or via routers 432 and 430.

In some embodiments, wideband receivers 404 and 422 and narrowband receivers 406 and 424 may include bidirectional digitizers with forward error correction (FEC) that convert between analog satellite signals and digital IP signals. In some embodiments, a data processing instance (included in session instances 434) may further implement a receiver/modem, and front end processor. Additionally, data processing instances 434 may include a command and control instance that allows a client to command and control the client's satellite.

In some embodiments, a client may utilize multiple satellite antennas to communicate with the client's satellite during a contact session. For example, in some embodiments, a client may communicate with the client's satellite using both satellite antenna 402 and 420 during the contact session. In some embodiments, a client may downlink as much as 7,000 megabits per second of data over two channels. In some embodiments, an electronically steered array of satellite antennas may allow for multiple contacts with a single satellite sensor, concurrently or sequentially.

Figure 5:
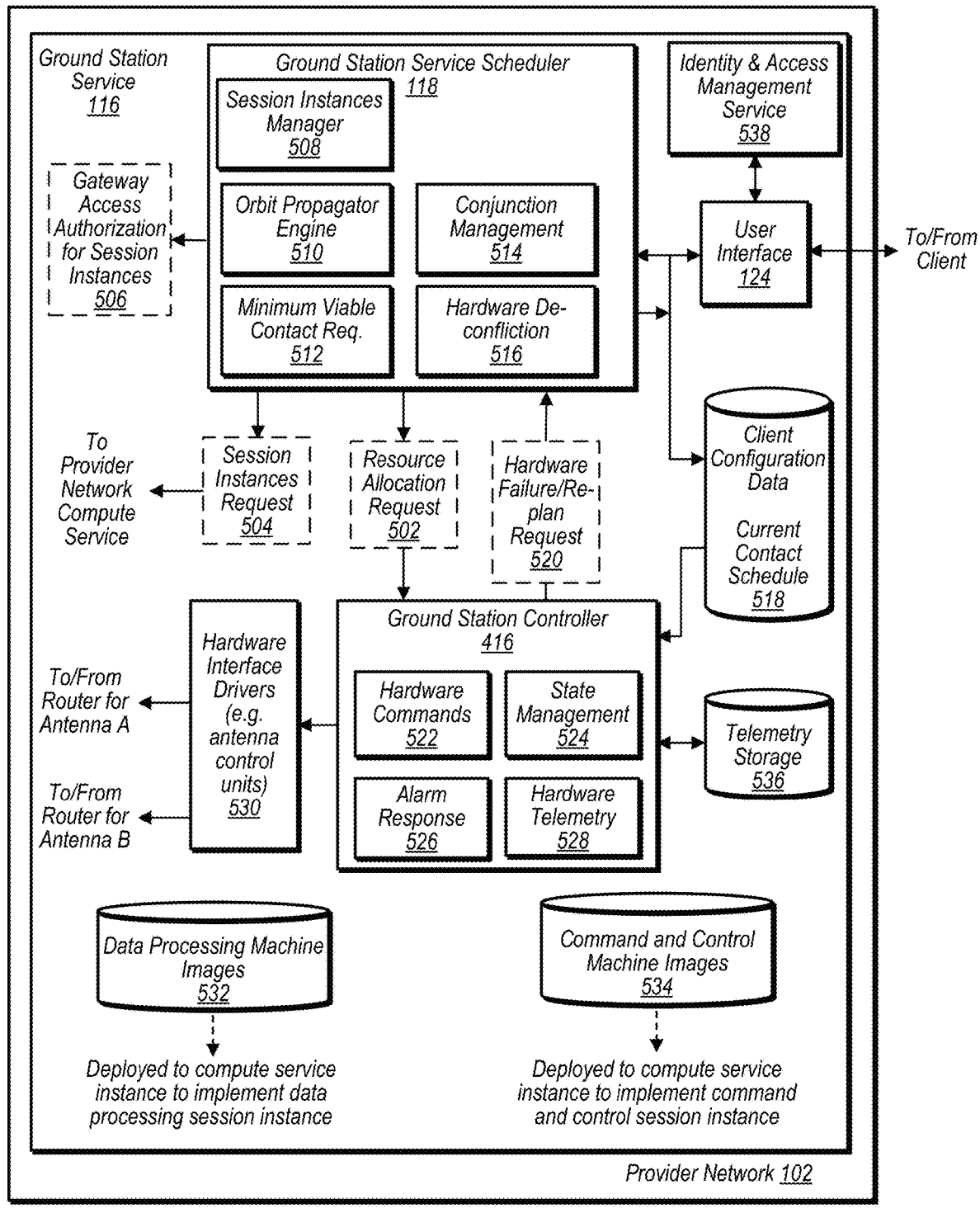
FIG. 5 illustrates a more detailed view of components that may be included in a satellite antenna ground station service, according to some embodiments.

FIG. 5 illustrates a more detailed view of components that may be included in a satellite antenna ground station service, according to some embodiments. For example, FIG. 5 illustrates additional details about components that may be included in a ground station service 116 as illustrated in FIG. 1, or any of the satellite antenna ground station services described herein.

In some embodiments, an identity and access management service 538 included in a satellite antenna ground station service, such as ground station service 116, or available to a satellite antenna ground station service, such as ground station service 116, may receive satellite identification information and ownership/authorization information and may verify that a client is authorized to communicate with a given satellite. As shown in FIG. 1, in some embodiments, an identity and access management service or component may be included in a satellite antenna ground station service scheduler or may be separate.

For example, an identity and access management service, such as identify and access management service 538, may receive a satellite identifier, such as a NORAD Catalog Number, NORAD ID, NASA catalog number, USSPACE-COM object number, a catalog number and similar variants, a COSPAR number, etc. from a client via user interface 124 along with other identifying information or authorization information. In order to verify authorization, the identity and access management service may maintain an authorization database and may compare submitted information to information stored in the authorization database in order to verify a client' authorization to communicate with a satellite. Also, in some embodiments, an identity and access management service, such as identity and access management service 538, may submit information provided by a client to a third-party to verify authorization, such as to governmental entity. Once authorization/ownership has been verified, the client may then schedule contact sessions with the verified satellite via ground station service scheduler 118.

In some embodiments, a ground station service scheduler included in a satellite antenna ground station service, such as ground station service scheduler 118 included in ground station service 116, may include a session instances manager 508 that causes session instances to be instantiated for a client prior to a scheduled reserved time-slot. In some embodiments, a session instances manager, such as session instances manager 508, may cause machine images to be loaded on the instantiated session instances to implement a client data processing instance (as shown in 604 of FIG. 6) or a client command and control instance (as shown in 610 of FIG. 6). In some embodiments, a session instance manager 508 may cause a stored data processing machine image stored in data processing machine images storage 532 to be booted on an instantiated session instance to implement a client data processing session instance. In a similar manner, session instance manager 508 may cause a stored client command and control machine image stored in command and control machine images storage 534 to be booted on an instantiated session instance to implement a client command and control session instance.

In some embodiments, a ground station service scheduler, such as ground station service scheduler 118, may include an orbit propagator engine 510 to determine respective orbit locations of satellites at future times. These predicted orbit locations may be used when selecting a time-slot and ground station for a requested contact session (e.g. satellite antenna access time-slot reservation) with a particular satellite. Additionally, a ground station service scheduler 118 may include a minimum viable contact requirements store 512 for use in scheduling contacts with client satellites. Also, a ground station service scheduler may include a conjunction management element 514 to determine how communications with a particular satellite may be affected by the actual or apparent proximity of other orbiting objects. Additionally, a ground station service scheduler may include a hardware deconfliction element 516 to resolve conflicting requests for the same satellite antenna hardware at the same time.

In some embodiments, a ground station service scheduler, such as ground station service scheduler 118, may submit a session instance request 504 to a provider network compute service, such as compute service 126, prior to a reserved time slot. The compute service may provide session instances that are then loaded with (or booted with) data processing machine images from data processing machine images store 532 and that are then loaded with (or booted with) client command and control machine images from command and control machine images store 534. Additionally, the ground station service scheduler 118 may submit a resource allocation request 502 to a ground station controller, such as ground station controller 416 and may submit a gateway access authorization 506 for the session instances to gateways 438 and 440. In some embodiments, a client may not be able to access a ground station controller or downlink data router via a gateway prior to a reserved time-slot.

In some embodiments, a satellite antenna ground station service, such as ground station service 116, may store client configuration data and a current contact schedule in a data store 518. The satellite antenna ground station service may further store telemetry information for client satellites in a telemetry storage 536. A ground station controller, such as ground station controller 416, may include a state management system 524 for maintaining state with a satellite during a contact session. Additionally, the ground station controller may include a hardware telemetry system 528 to adjust an antenna based on satellite telemetry during a contact session. In addition a ground station controller 416 may include a hardware command module 522 to generate hardware commands for satellite antenna hardware and an alarm response module 526 to indicate satellite antenna alarms and/or to allow for response to satellite antenna alarms. Additionally, a ground station controller 416 may issue commands to a hardware interface driver(s) 530 that may work in conjunction with an antenna control unit 410 or an antenna control unit 428 to execute the commands issued by the ground station controller 416. For example, a ground station controller may cause a satellite antenna to be actuated in a direction of a satellite with which the satellite antenna is to make contact and may adjust the antenna during a contact session to maintain contact with the satellite.

In some embodiments, a ground station controller, such as ground station controller 416, may send a hardware failure/re-plan request 520 to a ground station service scheduler, such as ground station service scheduler 118, in response to a failure of a satellite antenna or hardware associated with the satellite antenna. For example, in some embodiments, a satellite antenna ground station service may, in response to a hardware failure/re-plan request 520, reserve a time-slot on another satellite antenna at the ground station or another ground station. In some embodiments, a satellite antenna ground station service may provide access to another satellite antenna at the same ground station for a remaining duration of a current contact session.

Figure 6:
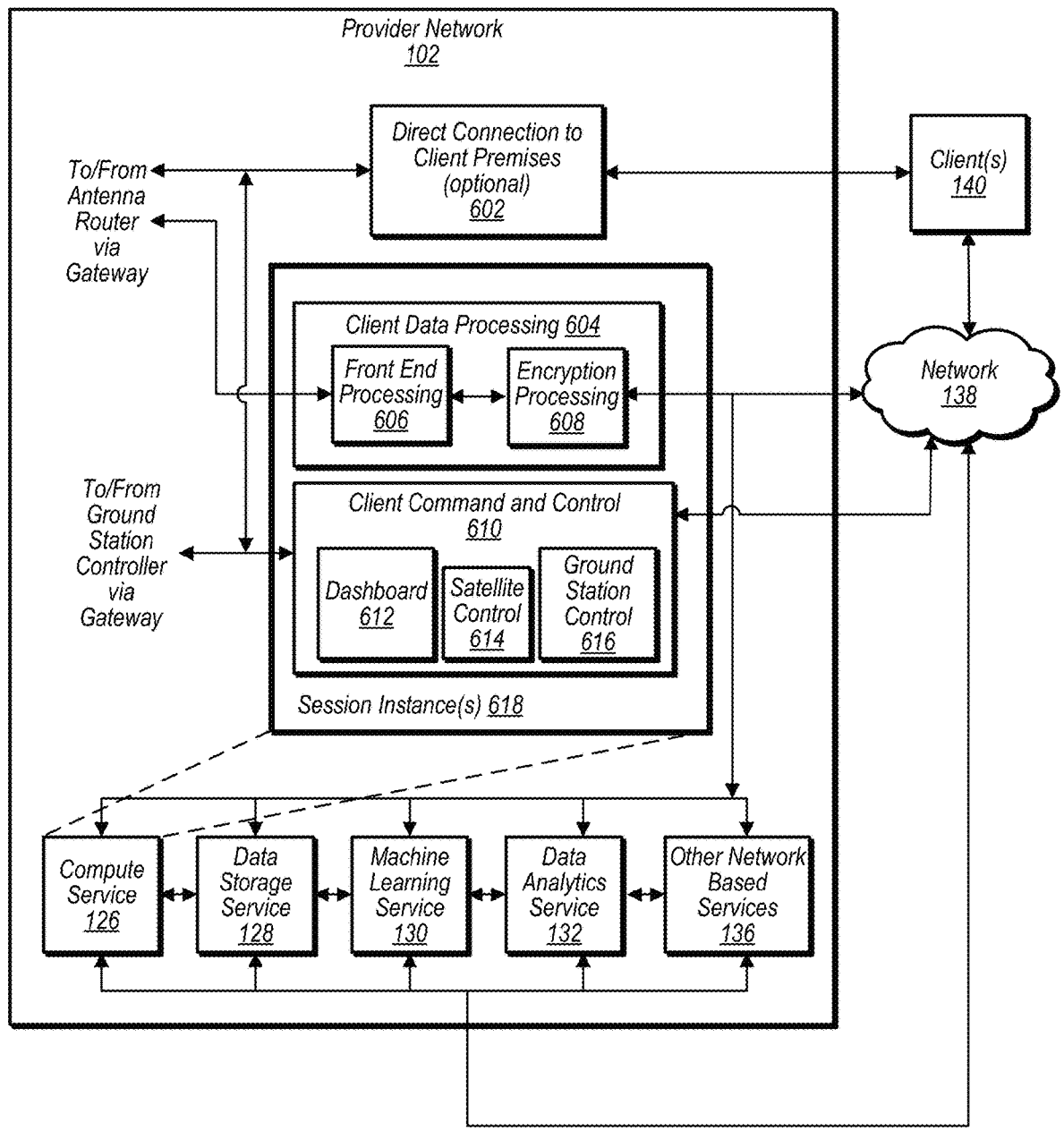
FIG. 6 illustrates components of a provider network that may be used in connection with a satellite antenna access session for contact with a client satellite, according to some embodiments.

FIG. 6 illustrates components of a provider network that may be used in connection with a satellite antenna access session for contact with a client satellite, according to some embodiments.

As previously discussed, session instances may be provided to a client prior to and during a contact session. For example, FIG. 6 illustrates session instances 618 that are provided to client 140 during a contact session (e.g. a reserved satellite antenna access time-slot). Also, in some embodiments, a client may be provided a direct connection 602 from a provider network data center to the client's premises, wherein downlinked data is processed by the client at the client's premises.

In some embodiments, session instances 618 may include a client data processing instance 604 and a client command and control instance 610. In some embodiments, a client data processing instance 604 may include a front end processing element 606 and/or an encryption processing element 608. In some embodiments, a client command and control instance 610 includes a satellite status and health dashboard 612, a satellite control module 614, and/or a ground station control module 616. For example, status and health dashboard 612 may provide status and health information as shown in status and health dashboard 702 illustrated in FIG. 7. As another example, satellite control module 614 may cause execution of commands received via satellite command interface 712 illustrated in FIG. 7. As yet another example, ground station control module 614 may cause execution of commands received via ground station control interface 720 illustrated in FIG. 7.

Figure 8:
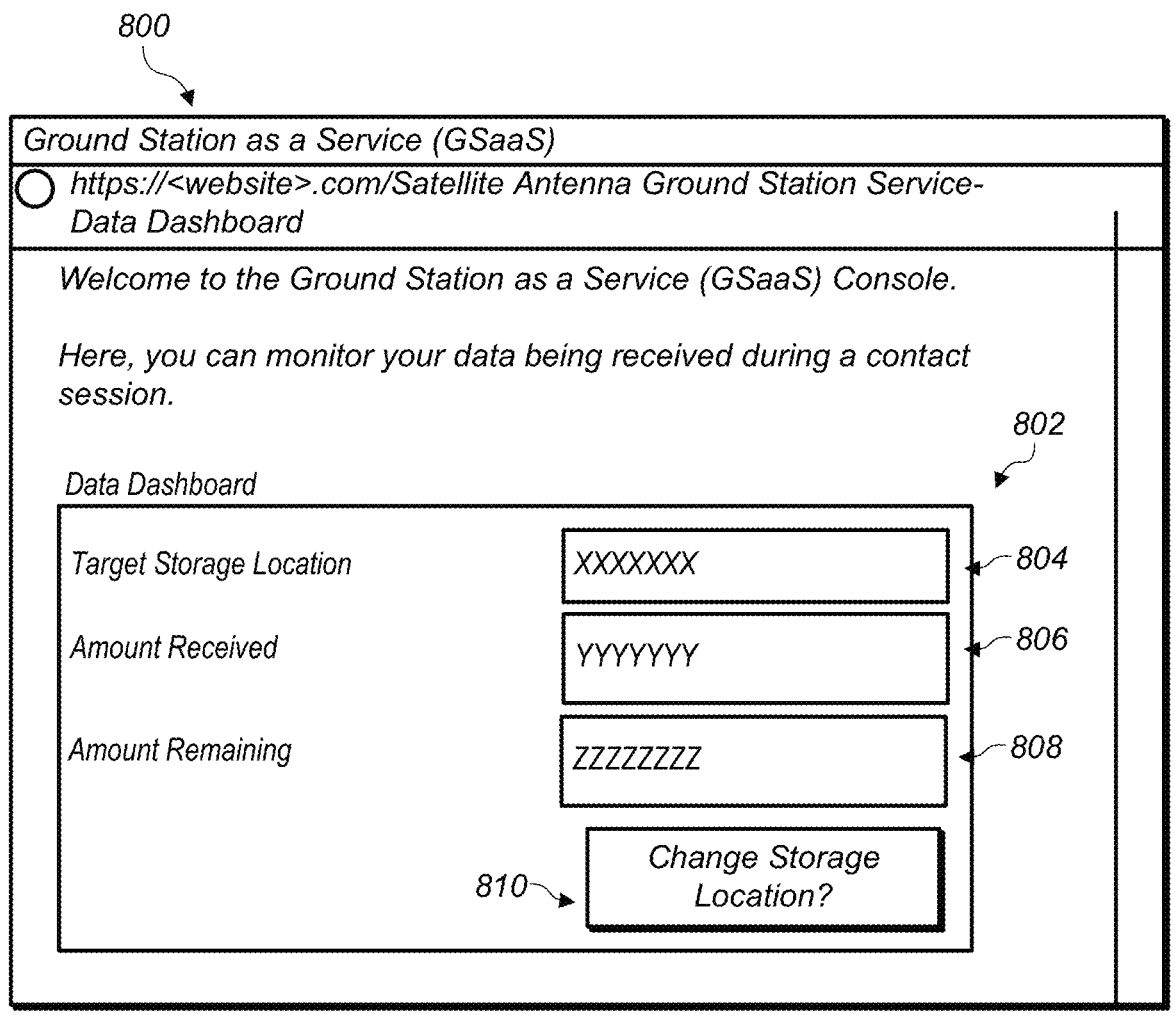
FIG. 8 illustrates an example graphical user interface of a satellite antenna ground station service for providing a data downlink dashboard to a client, according to some embodiments.

In some embodiments, client data processing instance 604 may further include a data dashboard module (not shown) that implements a data dashboard 802 as shown in FIG. 8.

In some embodiments, downlink data received via a gateway 438 or 440 may be routed to client data processing instance 604 and be further processed via front end processing element 606 and may be decrypted via encryption processing element 608. The processed and decrypted data may be routed to any one of a plurality of services offered by provider network 102, such as compute service 126, data storage service 128, machine learning service 130, data analytics service 132, other network based services 136, etc. Also the processed data may alternatively or additionally be provided to client(s) 140 via network 138. Also data processed or generated by any of the services of the provider network may also be accessed by client(s) 140 via network 138.

In some embodiments client(s) 140 may include satellite owner/operators and/or other client(s) that utilize services of a service provider network. The other clients may not have access to session instances 618, but may utilize other services of the provider network. Clients of a provider network may convey network-based services requests to provider network 102 via external network 138. In various embodiments, external network 138 may encompass any suitable combination of networking hardware and protocols necessary to establish network-based communications between clients and provider network 102. For example, a network 138 may generally encompass the various telecommunications networks and service providers that collectively implement the Internet. A network 138 may also include private networks such as local area networks (LANs) or wide area networks (WANs) as well as public or private wireless networks. For example, both a given client and provider network 102 may be respectively provisioned within enterprises having their own internal networks. In such an embodiment, a network 138 may include the hardware (e.g., modems, routers, switches, load balancers, proxy servers, etc.) and software (e.g., protocol stacks, accounting software, firewall/security software, etc.) necessary to establish a networking link between given a client and the Internet as well as between the Internet and provider network 102. It is noted that in some embodiments, clients 140 may communicate with provider network 102 using a private network rather than the public Internet, such as direct connection 602.

Provider network 102 may be set up by an entity such as a company or a public sector organization to provide one or more services (such as various types of cloud-based computing or storage) accessible via the Internet and/or other networks to clients 140. In some embodiments, provider network 102 may be the same as provider network 102 described in FIGS. 1 and 2. Provider network 102 may include numerous data centers (such as the data centers described in regard to FIGS. 1-2, above) hosting various resource pools, such as collections of physical and/or virtualized computer servers, storage devices, networking equipment and the like (e.g., computing system 1200 described below with regard to FIG. 12), needed to implement and distribute the infrastructure and services offered by the provider network 102. In some embodiments, provider network 102 may provide computing resources, such as virtual compute service 126, data storage services 128, such as a block-based storage service or various other storage types such as object/key-value based data stores or various types of database systems such as database service 134, and/or any other type of network-based services 136. Clients 140 may access these various services offered by provider network 102 via network 138. Likewise network-based services may themselves communicate and/or make use of one another to provide different services. For example, computing resources offered to clients 140 in units called "instances," such as virtual or physical compute instances or storage instances, may make use of other resources.

Compute service 126 may offer various compute instances to clients 140. A virtual compute instance may, for example, be implemented on one or more resource hosts included in a data center such as the data centers described in FIGS. 1 and 2 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 126 in different embodiments, including special purpose computer servers, storage devices, network devices and the like. In some embodiments instance clients 140 or any other user may be configured (and/or authorized) to direct network traffic to a compute instance.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 140 to access an instance.

Clients of a service provider network may encompass any type of client configurable to submit requests to provider network 102. For example, a given client may include a suitable version of a web browser, or may include a plug-in module or other type of code module configured to execute as an extension to or within an execution environment provided by a web browser. Alternatively, a client may encompass an application such as a database application (or user interface thereof), a media application, an office application or any other application that may make use of compute instances of compute service 126, or other network-based services in provider network 102 to perform various operations. In some embodiments, clients 140 may include satellite owners/operators and/or other clients of a service provider network. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 140 may be configured to generate network-based services requests according to a Representational State Transfer (REST)-style network-based services architecture, a document- or message-based network-based services architecture, or another suitable network-based services architecture.

Figure 7:
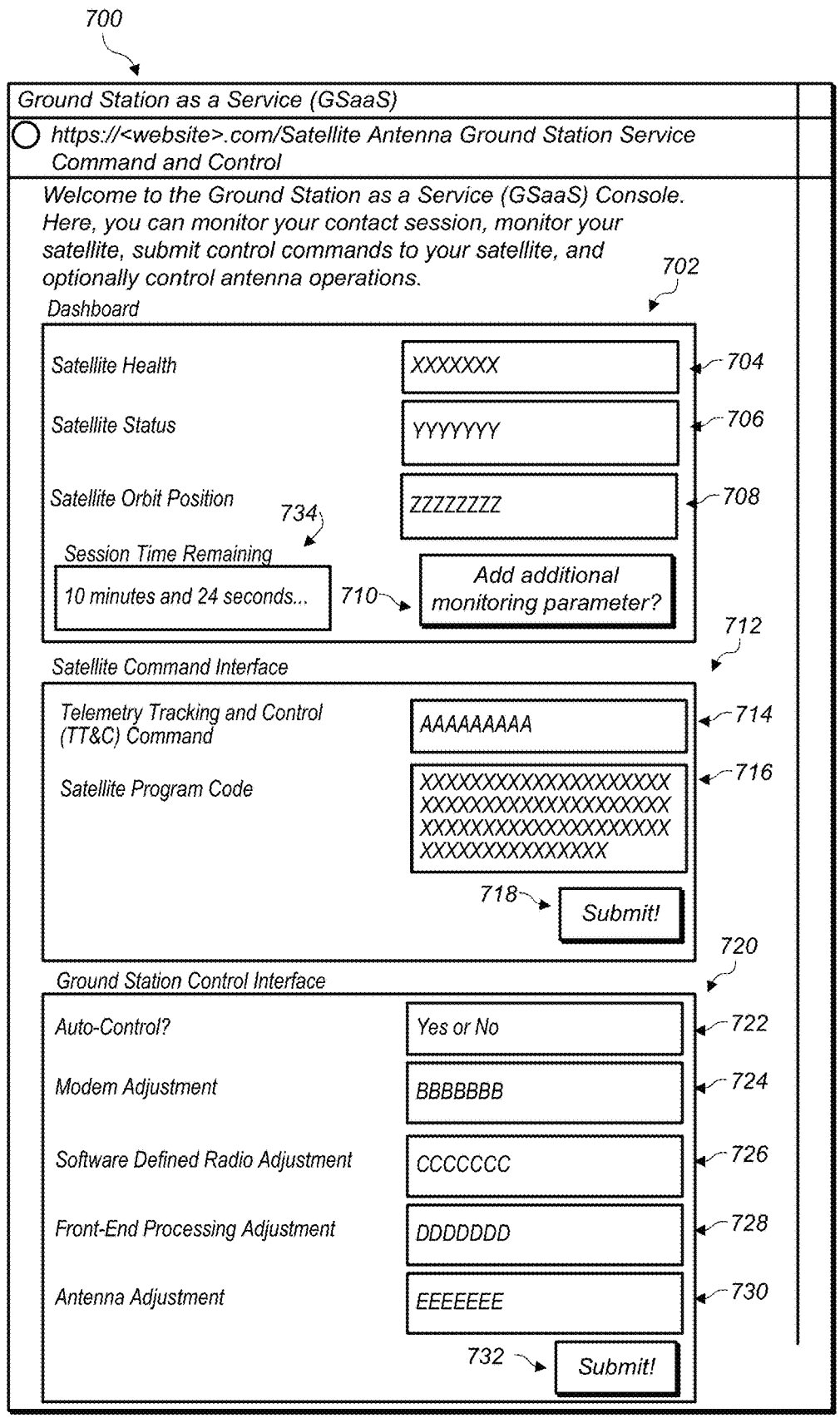
FIG. 7 illustrates an example graphical user interface of a satellite antenna ground station service for providing command and control options to a client, according to some embodiments.

FIG. 7 illustrates an example graphical user interface of a satellite antenna ground station service for providing command and control options to a client, according to some embodiments.

In some embodiments, a user interface of a satellite antenna ground station service, such as user interface 124 of ground station service 116 illustrated in FIG. 1, may provide a client a graphical user interface for satellite and satellite antenna command and control. For example, command and control interface 700 includes dashboard element 702, a satellite command interface 712, and a ground station control interface 720.

In some embodiments, a dashboard, such as dashboard 702, may provide a client with information about the client's satellite, information about a ground station/satellite antenna allocated to the client during a contact session, and information about the contact session. In some embodiments, a dashboard may be configurable by a client to include information elements that are most relevant to the client. For example, dashboard 702 includes satellite health element 704, satellite status element 706, satellite orbit position 708, session countdown clock 734, and button 710 that allows the client to add additional monitoring parameters to dashboard 702, modify monitoring parameters included in dashboard 702, or remove monitoring parameters included in dashboard 702.

In some embodiments, a satellite command interface, such as satellite command interface 712, includes one or more command elements that allow a client to remotely control the client's satellite. For example, satellite command interface 712, includes telemetry, tracking, and control command element 714 and satellite program code element 716. For example, in some embodiments, a client may uplink a command code for a mission to be carried out by a satellite via satellite program code element 716 and/or may issue satellite navigation or other commands to a client's satellite via telemetry, tracking, and control command element 714.

In some embodiments, in order to execute commands entered via telemetry, tracking, and control command element 714 and satellite program code element 716 a client may select submit button 718. In response, a client command and control instance, such as client command and control instance 610, may issue the indicated commands to a ground station controller, such as ground station controller 416, or to a client's satellite via a wideband receiver, narrow band receiver, or other band receiver, such as wideband receivers 404 and 422, narrowband receivers 406 and 424, or other band receivers 408 and 426. In some embodiments, satellite command and control may be signaled via S-band frequencies at a rate of approximately 56 kbps and a ground station may receive mission payload data via X, Ka, C, or Ku frequency bands at a rate of 50-1,000 mbps. Both command signals and payload signals may be converted between analog and digital signals via a software defined radio and/or digitizer included in a wideband receiver, narrowband receiver, or other band receiver.

In some embodiments, a ground station command interface, such as ground station command interface 720, includes one or more command elements that allow a client to remotely control a satellite antenna and/or other components of a ground station allocated to the client during a contact session (e.g. a reserved satellite antenna client access time slot). For example, ground station command interface 720, includes an auto control option 722, a modem adjustment element 724, a software defined radio adjustment element 724, a front-end processing adjustment element 728, and an antenna adjustment element 730. For example, in some embodiments, a client may opt for automatic control of a satellite antenna, wherein modem adjustments, software defined radio adjustments, front-end processing adjustments, and antenna adjustment are automatically performed for the client during a contact session (e.g. a reserved satellite antenna client access time slot). In other embodiments, a client may make one or more adjustments to these parameters via a modem adjustment element 724, a software defined radio adjustment element 724, a front-end processing adjustment element 728, and/or an antenna adjustment element 730. In order to implement a client adjustment, a client may select submit button 732. In response, the submitted adjustment(s) may be carried out by a ground station controller, such as ground station controller 416, or by a front end processor of a session instance, such as front end processing element 606 of client data processing instance 604. In some embodiments, example adjustments that may be made via a ground station control interface, such as ground station control interface 720, include a frequency adjustment for communication frequencies used to contact the client's satellite, protocol adjustments, frame synchronization adjustments, pre-defined configurations for normal operations and anomaly operations, and/or other adjustments.

FIG. 8 illustrates an example graphical user interface of a satellite antenna ground station service for providing a data downlink dashboard to a client, according to some embodiments.

In some embodiments, a user interface of a satellite antenna ground station service, such as user interface 124 of ground station service 116 illustrated in FIG. 1, may provide a client a data dashboard during a contact session. For example, data dashboard interface 800 includes data dashboard 802. Data dashboard 802 may be implemented based on information received by a user interface from a client data processing instance, such as client data processing instance 604.

In some embodiments, a data dashboard, such as data dashboard 802, may include a target storage location element 804 for data downlinked from a client satellite. In some embodiments, a data dashboard may also include an indicator 806 that indicates an amount of downlinked data received and an indicator 808 that indicates an amount of downlinked data yet to be received. In some embodiments, a data dashboard, such as data dashboard 802, may further include a storage location selection element 810 that allows a client to select a storage location for data received from the client's satellite. For example, a client may select a storage location in a storage service of a provider network, such as data storage service 128.

Figure 9:
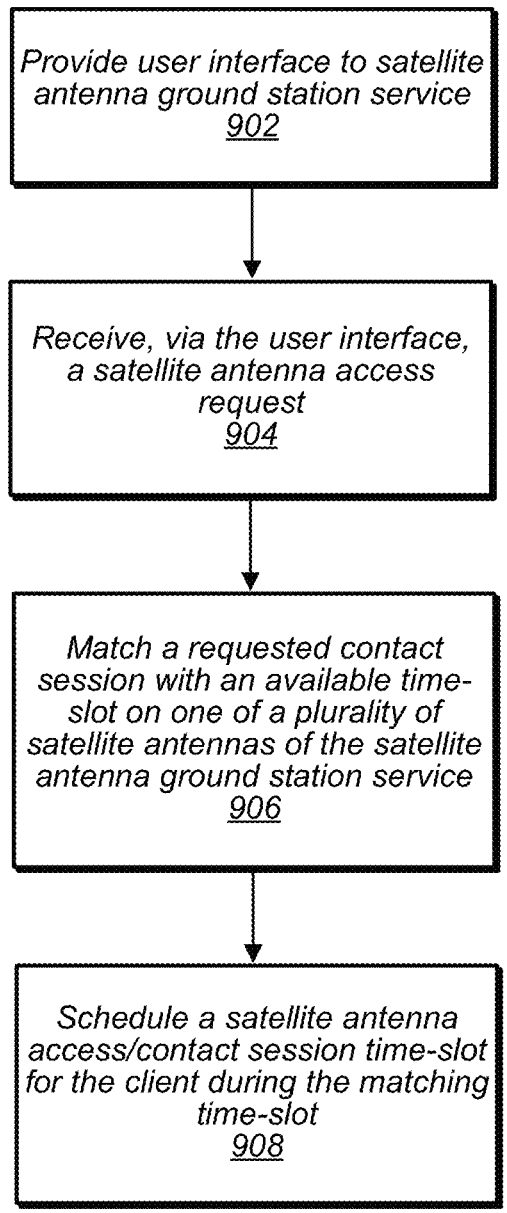
FIG. 9 is a high-level flowchart illustrating various methods and techniques for providing satellite antenna access as a service to clients of a provider network, according to some embodiments.

FIG. 9 is a high-level flowchart illustrating various methods and techniques for providing satellite antenna access as a service to clients of a provider network, according to some embodiments.

At 902, a satellite antenna ground station service provides a user interface to clients of the satellite antenna ground station service to reserve satellite antenna access time-slots on satellite antennas included in ground stations of the satellite antenna ground station service and located around the world.

At 904, the satellite antenna ground station service receives, via the user interface, a satellite antenna access request from a client. The request may be received via a web-based graphical user interface or may be received programmatically via an API of the user interface, or via other means. In some embodiments, the request may indicate a client satellite that is to be contacted and may defer to the satellite antenna ground station service to select a time and ground station to use for contacting the client satellite. Or, the request may indicate a desired time-slot, desired ground station, or both, and the satellite antenna ground station service may attempt to reserve a satellite antenna access time slot at the requested time and/or the requested ground station. In some embodiments, the satellite antenna ground station service may provide alternative suggestions if a desired time-slot and/or ground station request cannot be met due to conflicting reservations.

For example, at 906, a satellite antenna ground station service may match requested time-slots and ground stations with available time slots at a plurality of ground stations of the satellite antenna ground station service for a plurality of clients.

At 908, the satellite antenna ground station service may schedule a satellite antenna access time-slot for the client in accordance with the request during a matching time slot. Upon successfully reserving a satellite antenna access time-slot for a client, the satellite antenna ground station service may provide a confirmation message to the client.

Figure 10:
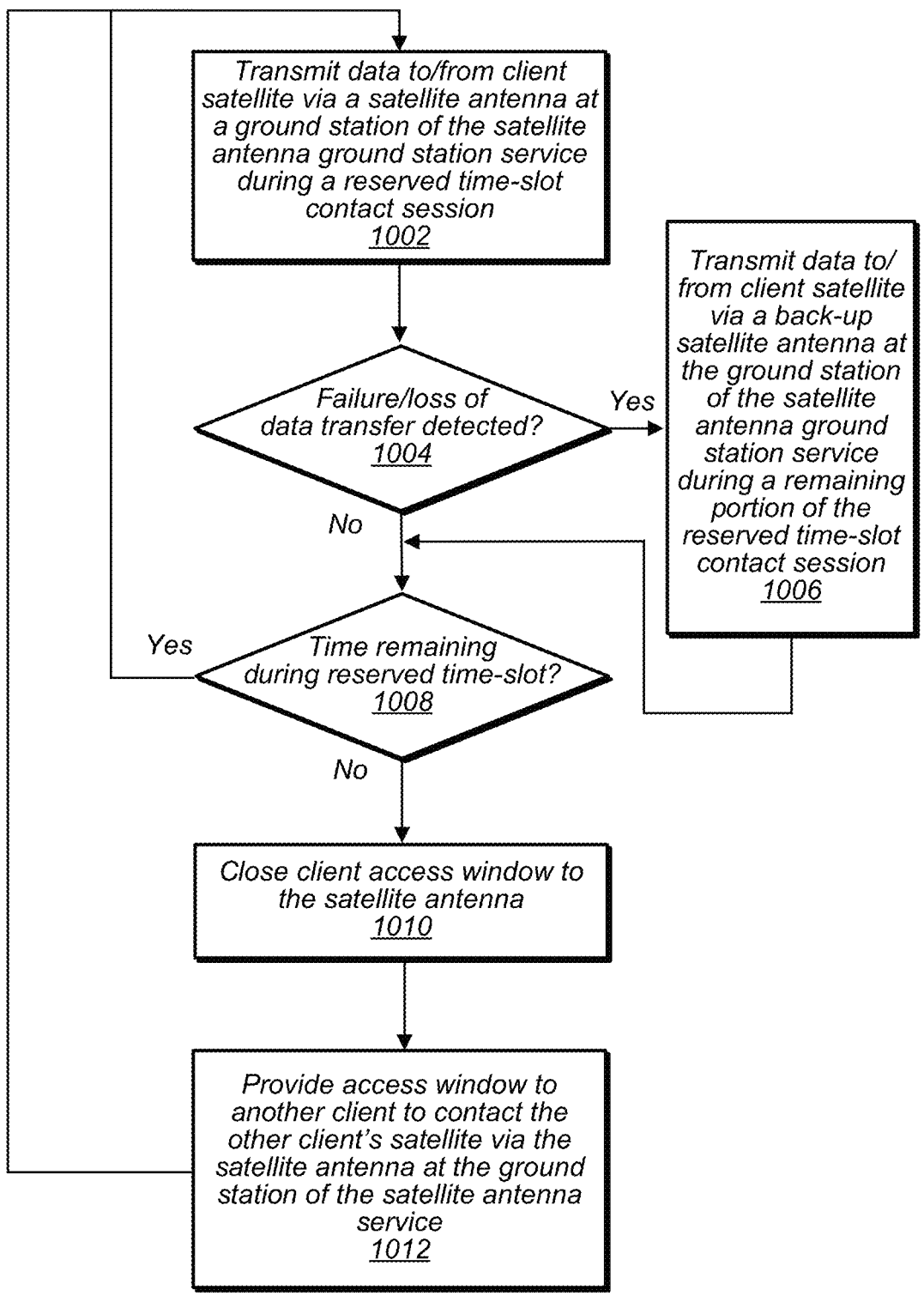
FIG. 10 is a high-level flowchart illustrating various methods and techniques for managing satellite antenna access during a satellite antenna access time slot, according to some embodiments.

FIG. 10 is a high-level flowchart illustrating various methods and techniques for managing satellite antenna access during a satellite antenna access time slot, according to some embodiments.

At 1002, during a contact session (e.g. a satellite antenna access time slot reserved for a client), a satellite antenna ground station service may transmit data to/from a client satellite via an allocated satellite antenna at a ground station of the satellite antenna ground station service.

At 1004, a satellite antenna ground station service may determine if a failure or other issue has caused a loss of data transfer between the allocated satellite antenna and the client's satellite. If a failure or loss of data transfer is detected, at 1006, the satellite antenna ground station service may transfer the client reservation to a spare satellite antenna and continue to transmit data to/from the client's satellite via the spare satellite antenna. In some embodiments, each ground station may include at least two satellite antennas and associated hardware for redundancy.

At 1008, a satellite antenna ground station service may determine if there is time remaining during a reserved time-slot. If there is time remaining the satellite antenna ground station service may continue to transmit data at 1002. If there is not any time remaining in the reserved time-slot, the satellite antenna ground station service may close client access to a ground station gateway at 1010, such as gateway 438 or 440, and, at 1012, the satellite antenna ground station service may provide an access window via the gateway to another client of the satellite antenna ground station service for another time-slot reserved for the other client at the ground station.

Figure 11:
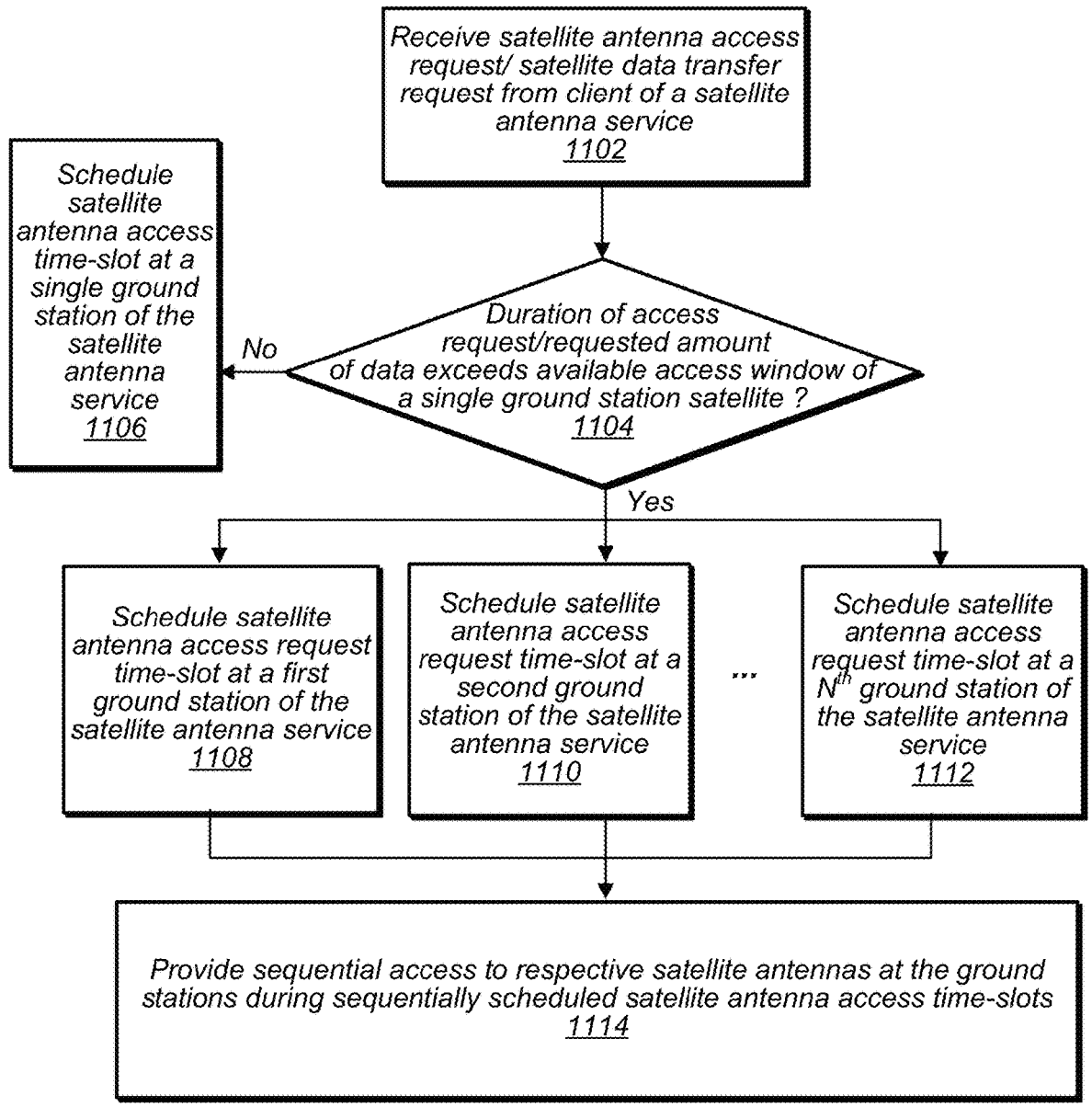
FIG. 11 is a high-level flowchart illustrating various methods and techniques for managing satellite antenna access requests involving multiple satellite antennas, according to some embodiments.

FIG. 11 is a high-level flowchart illustrating various methods and techniques for managing satellite antenna access requests involving multiple satellite antennas, according to some embodiments.

In some embodiments, a satellite antenna ground station service may coordinate contact sessions among multiple satellite antenna ground stations. For example, as a satellite orbits the earth, a satellite antenna ground station service may provide sequential contact sessions at ground stations in different locations that follow the orbit pattern of the satellite. For example, as the satellite ranges out of a range of a first ground station, a contact session at the first ground station may end and a new contact session at another ground station may begin, wherein the satellite is coming within range of the other ground station sequentially after leaving the range of the first ground station. In such situations, data downlinked from the satellite may be sent ahead over the provider network to a data center associated with the other ground station, such that the data downlinked from the satellite via the first ground station and the other ground station may be consolidated at the data center associated with the other ground station.

For example, at 1102 a satellite antenna ground station service may receive a satellite antenna request from a client of the satellite antenna ground station service to transfer data from the client's satellite to a storage location at the client's premises or included in a provider network that includes the satellite antenna ground station service.

At 1104, a scheduler of the satellite antenna ground station service may determine if a duration of the access request or an amount of data to be transferred indicated in the access request exceeds respective durations of access windows at ground stations of the satellite antenna ground station service or if the amount of data to be transferred exceeds an amount of data that can be transferred during a single access window at ground stations of the satellite antenna ground station service. If the answer is no, at 1106, the scheduler schedules a satellite antenna access time-slot for the client at a single ground station of the satellite antenna ground station service.

If the answer to 1104 is yes, the scheduler schedules satellite antenna access time-slots at 2 through N ground stations at 1108, 1110, and 1112, wherein the number "N" is a number of sequential contact sessions at different ground stations that are required to meet the client's requested access window duration or data transfer amount.

At 1114, the satellite antenna ground station service then provides sequential contact sessions at satellite antennas at multiple ground stations to fulfill the client's request.

Figure 12:
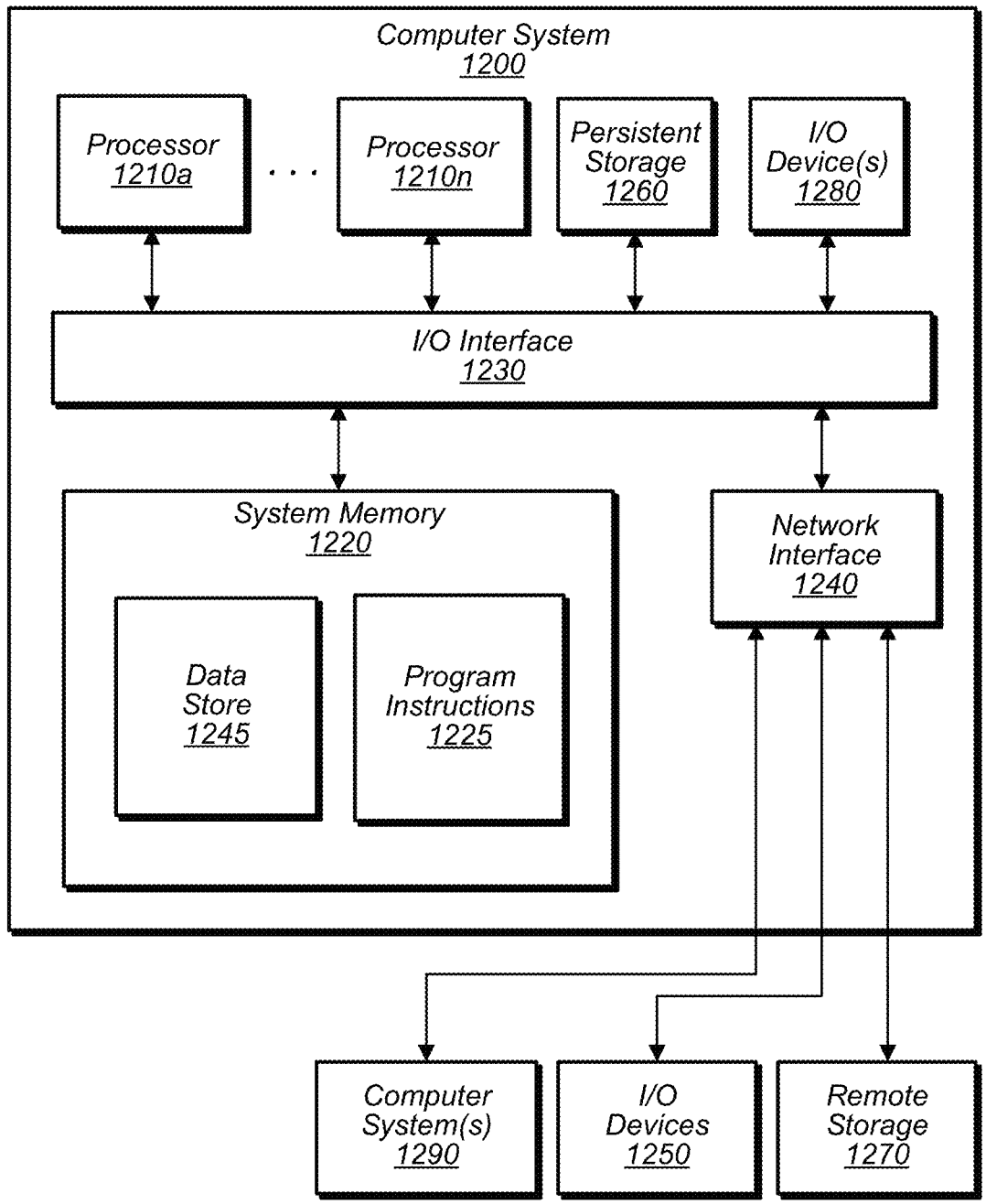
FIG. 12 is a block diagram illustrating an example computing system, according to some embodiments.

FIG. 12 is a block diagram illustrating an example computing system, according to some embodiments. For example, computer system 1200 may be configured to implement various components of a satellite antenna ground station service, storage and/or compute nodes of a provider network, a data stores, and/or a client, in different embodiments. Computer system 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1200 includes one or more processors 1210 (any of which may include multiple cores, which may be single or multi-threaded) coupled to a system memory 1220 via an input/output (I/O) interface 1230. Computer system 1200 further includes a network interface 1240 coupled to I/O interface 1230. In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. The computer system 1200 also includes one or more network communication devices (e.g., network interface 1240) for communicating with other systems and/or components over a communications network (e.g. Internet, LAN, etc.).

In the illustrated embodiment, computer system 1200 also includes one or more persistent storage devices 1260 and/or one or more I/O devices 1280. In various embodiments, persistent storage devices 1260 may correspond to disk drives, tape drives, solid state memory, other mass storage devices, block-based storage devices, or any other persistent storage device. Computer system 1200 (or a distributed application or operating system operating thereon) may store instructions and/or data in persistent storage devices 1260, as desired, and may retrieve the stored instruction and/or data as needed. For example, in some embodiments, computer system 1200 may host a storage system server node, and persistent storage 1260 may include the SSDs attached to that server node.

Computer system 1200 includes one or more system memories 1220 that are configured to store instructions and data accessible by processor(s) 1210. In various embodiments, system memories 1220 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 1225 that are executable by processor(s) 1210 to implement the methods and techniques described herein. In various embodiments, program instructions 1225 may be encoded in platform native binary, any interpreted language such as Java™ byte-code, or in any other language such as C/C++, Java™, etc., or in any combination thereof. For example, in the illustrated embodiment, program instructions 1225 include program instructions executable to implement the functionality of a resource host, in different embodiments. In some embodiments, program instructions 1225 may implement multiple separate clients, nodes, and/or other components.

In some embodiments, program instructions 1225 may include instructions executable to implement an operating system (not shown), which may be any of various operating systems, such as UNIX, LINUX, Solaris™, MacOS™, Windows™, etc. Any or all of program instructions 1225 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In some embodiments, system memory 1220 may include data store 1245, which may be configured as described herein. In general, system memory 1220 (e.g., data store 1245 within system memory 1220), persistent storage 1260, and/or remote storage 1270 may store data blocks, replicas of data blocks, metadata associated with data blocks and/or their state, configuration information, and/or any other information usable in implementing the methods and techniques described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems 1290, for example. In addition, network interface 1240 may be configured to allow communication between computer system 1200 and various I/O devices 1250 and/or remote storage 1270. Input/output devices 1250 may, in some embodiments, include one or more display terminals, keyboards, keypads, touchpads, scanning devices, voice or optical recognition devices, or any other devices suitable for entering or retrieving data by one or more computer systems 1200. Multiple input/output devices 1250 may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computer system 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.).

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. One or more non-transitory, computer-readable storage media storing program instructions, that when executed on or across one or more processors, cause the one or more processors to:
    determine a contact session for a registered satellite is upcoming within a threshold amount of time, wherein the contact session is to be performed using a satellite antenna ground station of a satellite antenna ground station service connected to a data center;
    instantiate, using computing hardware of the data center, a virtual machine configured to access the registered satellite via the satellite antenna ground station;
    enable the virtual machine to access the satellite antenna ground station at a first time of the contact session in order to contact the registered satellite; and
    disconnect the virtual machine from the satellite antenna ground station at an end time of the contact session.

2. The one or more non-transitory, computer-readable storage media of claim 1, wherein the virtual machine is configured to access the satellite antenna ground station using a modem managed by the satellite antenna ground station service.

3. The one or more non-transitory, computer-readable storage media of claim 1,
    wherein the satellite antenna ground station service is configured to send radio frequency signals received from the registered satellite, at the satellite antenna ground station, to the virtual machine using IP packets; and
    wherein the virtual machine is configured to process the radio frequency signals included in the IP packets using a software defined radio.

4. The one or more non-transitory, computer-readable storage media of claim 1, wherein the program instructions, when executed on or across the one or more processors, further cause the one or more processors to:
    obtain or generate a machine image to be used to instantiate the virtual machine configured to access the registered satellite via the satellite antenna ground station, wherein said obtaining or said generating is performed prior to said instantiating the virtual machine; and
    store the machine image to a storage device of the satellite antenna ground station service for use in instantiating the virtual machine during the threshold amount of time prior to the contact session.

5. The one or more non-transitory, computer-readable storage media of claim 1, wherein:
    a first client is associated with a first contact profile;
    a second client is associated with a second contact profile; and
    respective virtual machines provided for the first client and the second client are provided based on the respective contact profiles.

6. The one or more non-transitory, computer-readable storage media of claim 5, wherein the program instructions, when executed on or across the one or more processors, cause the one or more processors to enable the respective virtual machine of the second client to access the satellite antenna ground station subsequent to an end time of a contact session of the first client.

7. A method, comprising:
determining a contact session for a registered satellite is upcoming within a threshold amount of time, wherein the contact session is to be performed using a satellite antenna ground station of a satellite antenna ground station service connected to a data center;
instantiating, using computing hardware of the data center, a virtual machine configured to access the registered satellite;
enabling the virtual machine to access the satellite antenna ground station at a first time of the contact session in order to contact the registered satellite; and
disconnecting the virtual machine from the satellite antenna ground station at an end time of the contact session.

8. The method of claim 7, wherein the virtual machine is configured to access the satellite antenna ground station using a modem managed by the satellite antenna ground station service.

9. The method of claim 7,
wherein the satellite antenna ground station service is configured to send radio frequency signals received from the registered satellite to the virtual machine using IP packets; and
wherein the virtual machine is configured to process the radio frequency signals included in the IP packets using a software defined radio.

10. The method of claim 7, wherein:
a first client is associated with a first contact profile;
a second client is associated with a second contact profile; and
respective virtual machines provided for the first client and the second client are provided based on the respective contact profiles.

11. The method of claim 10, further comprising enabling the respective virtual machine of the second client to access the satellite antenna ground station subsequent to an end time of a contact session of the first client.

12. The method of claim 7, further comprising:
obtaining or generating a machine image to be used to instantiate the virtual machine configured to access the registered satellite via the satellite antenna ground station, wherein said obtaining or said generating is performed prior to said instantiating the virtual machine; and
storing the machine image to a storage device of the satellite antenna ground station service for use in instantiating the virtual machine during a threshold amount of time prior to the contact session.

13. The method of claim 7, wherein the virtual machine is configured to perform one or more of:
converting downlinked data to internet protocol data;
converting downlinked data into frames; or
decrypting downlinked data.

14. The method of claim 7, wherein the virtual machine is configured to perform one or more of:
generating a satellite status and health dashboard;
implementing a satellite control module; or
implementing a ground control module.

15. A satellite antenna ground station service, comprising:
a plurality of satellite antenna ground stations connected to a plurality of data centers; and
one or more computing devices, comprising one or more processors and one or more memories, configured to store and execute program instructions, that when executed on or across the one or more processors, cause the one or more processors to:
determine a contact session for a registered satellite is upcoming within a threshold amount of time, wherein the contact session is to be performed using one or more of the satellite antenna ground stations;
instantiate, on computing hardware of one or more of the data centers, a virtual machine configured to access the registered satellite;
enable the virtual machine to access the one or more satellite antenna ground stations at a first time of the contact session in order to contact the registered satellite; and
disconnect the virtual machine from the one or more satellite antenna ground stations at an end time of the contact session.

16. The satellite antenna ground station service of claim 15, wherein the virtual machine is configured to access the one or more of the satellite antenna ground stations using a modem managed by the satellite antenna ground station service.

17. The satellite antenna ground service of claim 15,
wherein the satellite antenna ground station service is configured to send radio frequency signals received from the registered satellite, at the one or more of the satellite antenna ground stations, to the virtual machine using IP packets; and
wherein the virtual machine is configured to process the radio frequency signals included in the IP packets using a software defined radio.

18. The satellite antenna ground station service of claim 15, wherein a registered satellite is a satellite that has been registered with a NORAD ID.

19. The satellite antenna ground station service of claim 18, wherein the NORAD ID is used as satellite identification information.

20. The satellite antenna ground station service of claim 18, wherein the NORAD ID is used as authorization information.

* * * * *